(12) United States Patent
Takai et al.

(10) Patent No.: US 9,879,877 B2
(45) Date of Patent: Jan. 30, 2018

(54) AIR CONDITIONING REGISTER

(71) Applicant: TOYODA GOSEI CO., LTD., Kiyosu-shi, Aichi-ken (JP)

(72) Inventors: Hajime Takai, Kiyosu (JP); Mitsuo Ogura, Kiyosu (JP); Minoru Shibata, Kiyosu (JP); Kenji Asano, Nagoya (JP)

(73) Assignee: TOYODA GOSEI CO., LTD., Aichi-pref. (JP)

( * ) Notice: Subject to any disclaimer, the term of this patent is extended or adjusted under 35 U.S.C. 154(b) by 533 days.

(21) Appl. No.: 14/055,944

(22) Filed: Oct. 17, 2013

(65) Prior Publication Data

US 2014/0120826 A1    May 1, 2014

(30) Foreign Application Priority Data

Oct. 30, 2012  (JP) .................................. 2012-239208
Aug. 28, 2013  (JP) .................................. 2013-177331

(51) Int. Cl.
| | |
|---|---|
| B60H 1/34 | (2006.01) |
| F24F 13/14 | (2006.01) |
| F24F 13/15 | (2006.01) |
| F24F 13/075 | (2006.01) |

(52) U.S. Cl.
CPC ....... *F24F 13/1426* (2013.01); *B60H 1/3421* (2013.01); *F24F 13/075* (2013.01); *F24F 13/15* (2013.01); *B60H 2001/3471* (2013.01)

(58) Field of Classification Search
CPC .................................. F24F 13/00; B60H 1/34
USPC .................................. 454/318, 150, 155, 151
See application file for complete search history.

(56) References Cited

U.S. PATENT DOCUMENTS

| | | | | |
|---|---|---|---|---|
| 2,777,302 A | * | 1/1957 | Spiegelhalter | .................. 62/279 |
| 2,813,474 A | * | 11/1957 | Honerkamp et al. | ......... 454/265 |
| 2,854,915 A | * | 10/1958 | Carr | .............................. 454/263 |
| 3,017,239 A | * | 1/1962 | Rodman | ........................ 96/226 |

(Continued)

FOREIGN PATENT DOCUMENTS

| | | |
|---|---|---|
| CN | 201688536 U | 12/2010 |
| CN | 102741075 A | 10/2012 |

(Continued)

OTHER PUBLICATIONS

Office Action dated Oct. 23, 2015 in the corresponding CN application No. 201310516731.7 (with English translation attached).

*Primary Examiner* — Steven B McAllister
*Assistant Examiner* — Samantha Miller
(74) *Attorney, Agent, or Firm* — Posz Law Group, PLC

(57) ABSTRACT

An air conditioning register is provided that includes a case, a downstream fin, a specific upstream fin extending in a direction perpendicular to the downstream fin, and an operation knob. The specific upstream fin includes a fin main body pivotally supported by the case via an upstream fin shaft and a transmission body pivotally supported by the case via a pivot located further upstream than the upstream fin shaft. The fin main body and the transmission body are coupled to each other. The operation knob is mounted slidably on the downstream fin and includes a pair of fork portions sandwiching a transmission shaft portion of the transmission body therebetween. When the operation knob is operated to slide and thereby the transmission shaft portion is moved, the fin main body of the specific upstream fin is tilted.

8 Claims, 20 Drawing Sheets

(56) References Cited

U.S. PATENT DOCUMENTS

| | | | | |
|---|---|---|---|---|
| 3,382,916 | A | * | 5/1968 | Laux .............................. 165/123 |
| 3,415,073 | A | * | 12/1968 | Ammons ..................... 62/259.1 |
| 3,888,090 | A | * | 6/1975 | Meyer ............................ 62/240 |
| 4,505,129 | A | * | 3/1985 | Yamane et al. ................. 62/280 |
| 4,971,139 | A | * | 11/1990 | Khattar .......................... 165/86 |
| 5,056,420 | A | * | 10/1991 | Komori ............... B60H 1/3421 454/155 |
| 5,461,880 | A | * | 10/1995 | Bolton et al. ................... 62/298 |
| 5,622,058 | A | * | 4/1997 | Ramakrishnan et al. ...... 62/295 |
| 7,455,581 | B2 | * | 11/2008 | Gehring ............... B60H 1/3428 454/155 |
| 7,780,508 | B2 | * | 8/2010 | Okuno ................ B60H 1/3428 454/109 |
| 2002/0025774 | A1 | * | 2/2002 | Yamaguchi .......... B60H 1/3428 454/155 |
| 2002/0178744 | A1 | * | 12/2002 | Tanabe ................. F24F 13/075 3/75 |
| 2003/0010001 | A1 | * | 1/2003 | Bryce et al. ..................... 55/467 |
| 2004/0038643 | A1 | | 2/2004 | Katagiri et al. |
| 2004/0219874 | A1 | * | 11/2004 | Karadia ............... B60H 1/3421 454/155 |
| 2006/0223430 | A1 | * | 10/2006 | Shibata ................ B60H 1/3421 454/155 |
| 2007/0111653 | A1 | * | 5/2007 | Endou .................. B60H 1/3421 454/155 |
| 2008/0146139 | A1 | * | 6/2008 | Terai .................... B60H 1/3421 454/155 |
| 2009/0286462 | A1 | * | 11/2009 | Goto .................... B60H 1/3428 454/155 |
| 2010/0120347 | A1 | * | 5/2010 | Gehring ................ B60H 1/345 454/155 |
| 2010/0130115 | A1 | * | 5/2010 | Miki ........................ B60H 1/34 454/155 |
| 2012/0291893 | A1 | | 11/2012 | Yamamoto et al. |

FOREIGN PATENT DOCUMENTS

| | | |
|---|---|---|
| JP | 2005-008050 A | 1/2005 |
| JP | 4055693 B2 | 12/2007 |
| JP | 2009-166518 A | 7/2009 |
| JP | 3176607 U | 6/2012 |

* cited by examiner

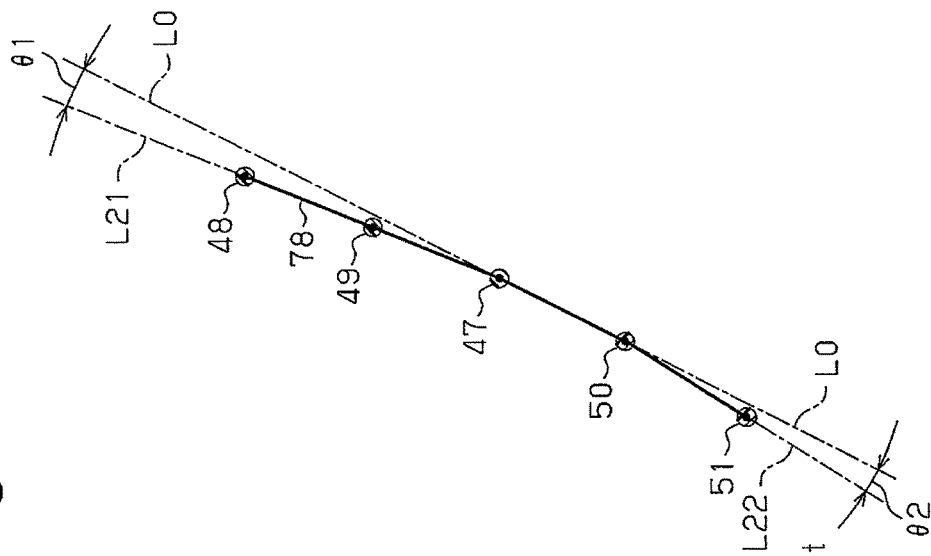
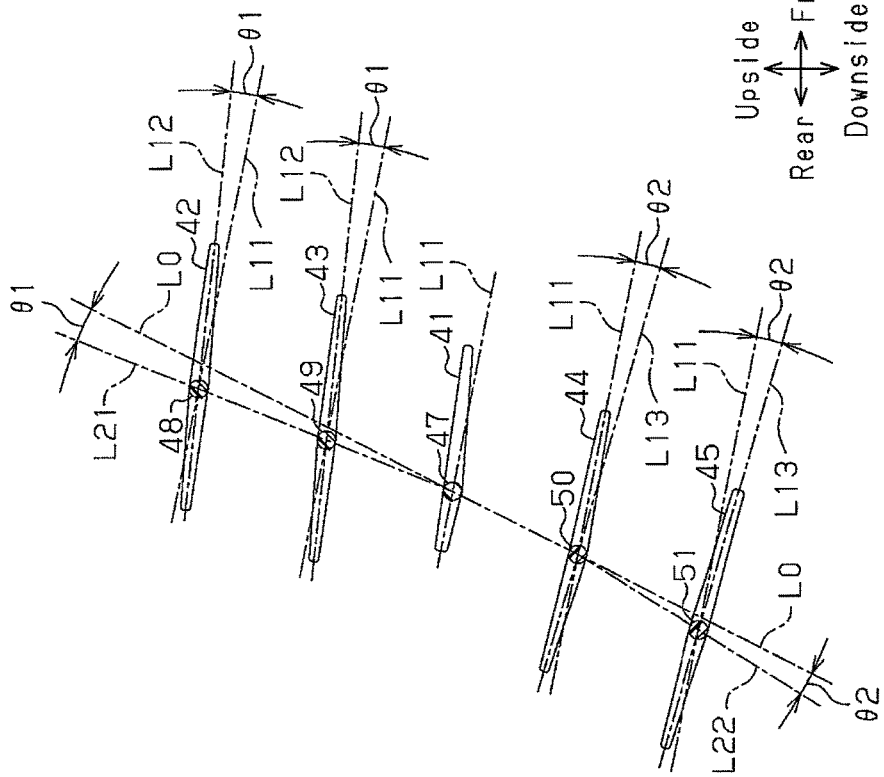

Fig.25
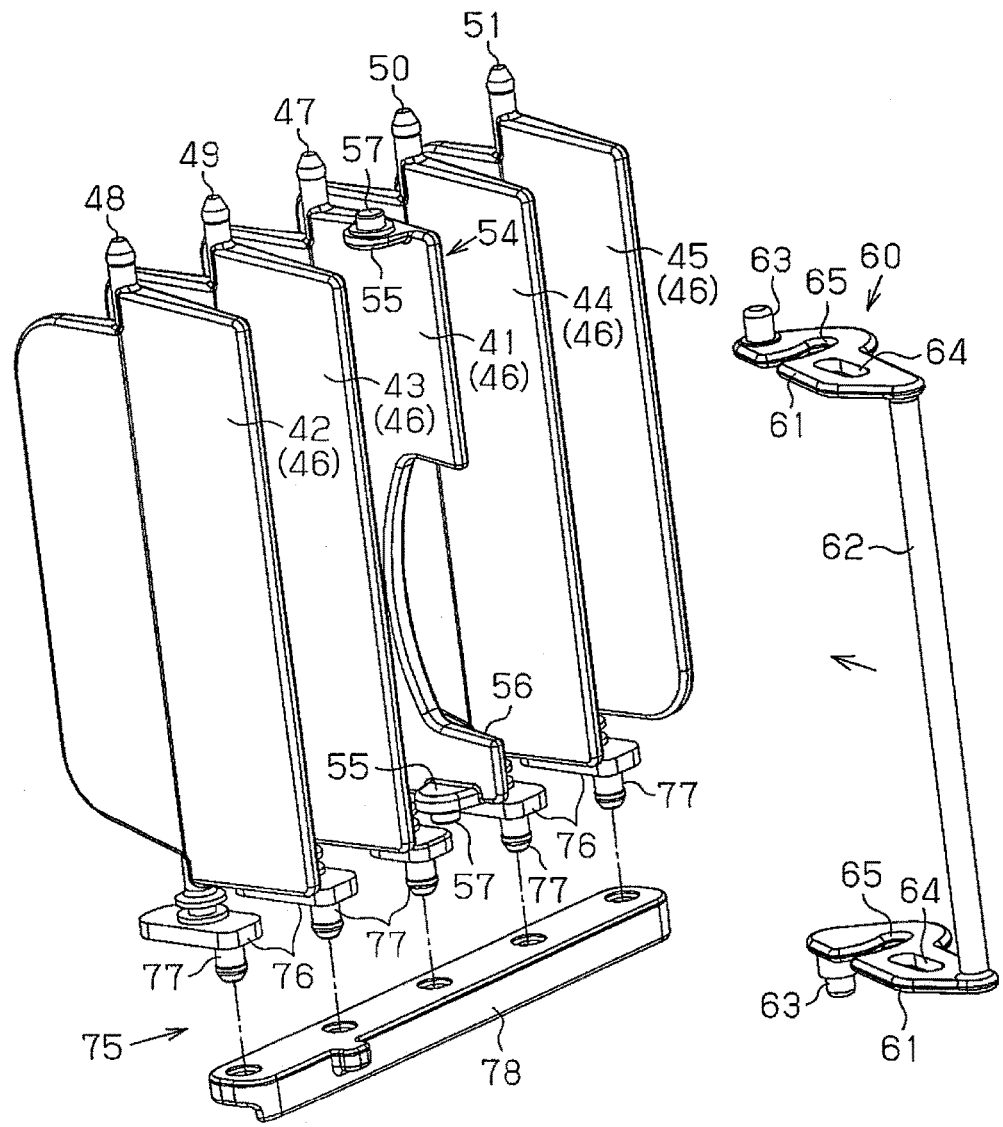
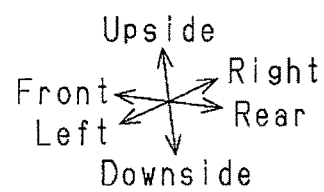

AIR CONDITIONING REGISTER

BACKGROUND OF THE INVENTION

The present invention relates to an air conditioning register in which fins are used to adjust the direction of flow of air conditioning air fed from an air conditioner to be blown into a compartment and, more particularly, to an air conditioning register having a structure in which fins are used to selectively open and close a ventilation passage.

Japanese Patent No. 4055693, for example, discloses an air conditioning register for adjusting the direction of flow of air conditioning air fed from an air conditioner to be blown into a passenger compartment, the register having a structure in which fins are used to close a ventilation passage.

The air conditioning register includes a case, multiple downstream fins, multiple upstream fins, and an operation knob. The downstream fins are each pivotally supported by the case via a downstream fin shaft. The upstream fins are located upstream of the downstream fins and extend in a direction perpendicular to the downstream fins. The upstream fins are each pivotally supported by the case via an upstream fin shaft. The operation knob is mounted on one of the downstream fins in a manner slidable in the axial direction of the downstream fin shafts. Further, in order to transmit the sliding operation of the operation knob to the upstream fins, the operation knob is formed with a rack, while the upstream fins are each formed with a pinion to mesh with the rack.

In the air conditioning register, when a force in the thickness direction of the downstream fins is applied to the operation knob, the downstream fins are tilted in the same direction about the downstream fin shafts. In this case, the rack is also tilted together with the downstream fins and thereby, with the pinion meshing with the rack, the rack slides on the teeth of the pinion in the face width direction of the rack (in the thickness direction of the downstream fins). Thus, the movement in the face width direction of the rack cannot be transmitted to the pinion and the upstream fins cannot be tilted. The air conditioning air is redirected to flow along the tilted downstream fins.

When the operation knob is operated to slide along the downstream fins, the rack meshes with and moves the pinion, so that the upstream fins are tilted about the upstream fin shafts. When the operation knob is operated in a normal movable range to slide along the downstream fins, the air conditioning air is redirected to flow along the tilted upstream fins. When the operation knob is operated in a specified movable range, which exceeds the normal movable range, to slide along the downstream fins, the upstream fins are tilted at a greater angle than that when operated to slide in the normal movable range, whereby the ventilation passage within the case is closed by the upstream fins and the air conditioning air cannot be blown out from the case.

On the other hand, Japanese Published Laid-Open Patent Publication No. 2009-166518, for example, discloses an air conditioning register of the type having a mechanism for transmitting the sliding operation of an operation knob to upstream fins but not configured to close a ventilation passage with the upstream fins. In the air conditioning register, one of the upstream fins has a transmission shaft portion extending parallel with the upstream fin shafts. The operation knob has a fork portion sandwiching the transmission shaft portion therebetween.

In the air conditioning register disclosed in Japanese Laid-Open Patent Publication No. 2009-166518, when a force in the thickness direction of the downstream fins is applied to the operation knob, the fork portion is also tilted in the same direction together with the downstream fins while sandwiching the transmission shaft portion therebetween. Thus, the movement of the fork portion cannot be transmitted to the transmission shaft portion and the upstream fins cannot be tilted. On the other hand, when the operation knob is operated to slide along the downstream fins, the transmission shaft portion is pressed by the fork portion and the upstream fins are tilted about the upstream fin shafts.

SUMMARY OF THE INVENTION

Such an air conditioning register that uses a rack and a pinion as disclosed in Japanese Patent No. 4055693 causes problems of bringing about an increase in pressure loss and/or generation of noise. This is for the following reason.

It is necessary to increase the dimension of the rack in the face width direction (in the thickness direction of the downstream fins) to keep the rack meshing with the pinion regardless of the angle at which the downstream fins are tilted when the operation knob is moved in the thickness direction of the downstream fins to tilt the downstream fins.

In air conditioning registers configured to close a ventilation passage with upstream fins, the upstream fins are tilted to close the ventilation passage at a greater angle than that in air conditioning registers not configured to close. The rack therefore has a great dimension in the teeth arrangement direction (in the axial direction of the downstream fin shafts).

The rack, which thus has a great dimension in both the face width direction (in the thickness direction of the downstream fins) and the teeth arrangement direction (in the axial direction of the downstream fin shafts), and accordingly has a high ventilation resistance, resulting in an increase in pressure loss and generation of noise.

Since the air conditioning register disclosed in Japanese Laid-Open Patent Publication No. 2009-166518 has a structure in which the fork portion sandwiches the transmission shaft portion therebetween regardless of the angle at which the downstream fins are tilted and further regardless of the angle at which the upstream fins are tilted, the fork portion can have a small dimension in the axial direction of the downstream fin shafts and in the thickness direction of the downstream fins.

Hence, it may be configured, using a structure of transmitting the sliding operation of the operation knob through the fork portion and the transmission shaft portion to the upstream fins, that the ventilation passage is closed with the upstream fins.

However, upon closing the ventilation passage with the upstream fins, it is necessary to tilt the upstream fins at a great angle by operating the operation knob to slide a long distance and thus rotating with the fork portion the transmission shaft portion about the upstream fin shafts at a great angle. In this case, however, the larger the movement amount the operation knob becomes, the weaker the force for rotating the transmission shaft portion about the upstream fin shafts becomes. It is therefore necessary to operate the operation knob to slide with a greater operating load to rotate the transmission shaft portion until the ventilation passage is closed.

Accordingly, it is an objective of the present invention to provide an air conditioning register with reduced pressure loss and noise generation in which with upstream fins, a ventilation passage can be closed with a reduced operating load on an operation knob.

To achieve the foregoing objective, and in accordance with one aspect of the present invention, an air conditioning register is provided that includes a case, a downstream fin, a group of upstream fins, and an operation knob. The case has a ventilation passage for air conditioning air. The downstream fin is pivotally supported by the case via a downstream fin shaft. The group of upstream fins includes a specific upstream fin and at least one normal upstream fin. Each upstream fin is pivotally supported by the case via an upstream fin shaft. The specific upstream fin and the normal upstream fin are located upstream of the downstream fin. The specific upstream fin and the normal upstream fin extend in a direction perpendicular to the downstream fin, and are coupled to each other. The specific upstream fin has a transmission shaft portion extending parallel with the upstream fin shafts. The operation knob is mounted on the downstream fin in a manner slidable in the axial direction of the downstream fin shaft and having a fork portion sandwiching therebetween the transmission shaft portion of the specific upstream fin. The fork portion is configured to move the transmission shaft portion according to sliding of the operation knob. The normal upstream fin and the specific upstream fin are pivotal to selectively open and close the ventilation passage. The specific upstream fin is dividable into a fin main body having the upstream fin shaft and a transmission body having the transmission shaft portion and coupled to the fin main body. The transmission body includes a pair of pivots arranged to be displaced toward the upstream side from the upstream fin shaft of the fin main body. The transmission body is pivotally supported by the case via the pivots.

Other aspects and advantages of the present invention will become apparent from the following description, taken in conjunction with the accompanying drawings, illustrating by way of example the principles of the invention.

BRIEF DESCRIPTION OF THE DRAWINGS

The invention, together with objects and advantages thereof, may best be understood by reference to the following description of the presently preferred embodiments together with the accompanying drawings in which:

FIG. 6A is a side cross-sectional view of the upstream fins shown in FIG. 5;

FIG. 6B is a side cross-sectional view showing the positional relationship of the upstream fin shafts shown in FIG. 6A;

FIG. 25 is an exploded perspective view of the second embodiment, showing a specific upstream fin (fin main body, transmission body), normal upstream fins, and a coupling rod;

DETAILED DESCRIPTION OF THE PREFERRED EMBODIMENTS

First Embodiment

An air conditioning register according to a first embodiment will hereinafter be described with reference to FIGS. 1 to 22. The air conditioning register is for use in a vehicle. The air conditioning register has a thin structure with the horizontal dimension being smaller than the vertical dimension.

In the description below, the traveling direction (direction of forward movement), the direction of rearward movement, and the height direction of the vehicle are defined, respectively, as front, rear, and vertical. The right and left in the width direction (lateral direction) of the vehicle are also defined based on the direction of forward movement of the vehicle.

In the passenger compartment, an instrument panel is provided in front of the vehicle front seats (the driver seat and the front passenger seat). Air conditioning registers are assembled in, for example, a central portion and side portions of the instrument panel in the vehicle width direction. Like normal air conditioning registers that is not thin, the air conditioning register mainly has a feature of adjusting the direction of flow of air conditioning air fed from an air conditioner to be blown into the passenger compartment and a feature of selectively enabling and disabling the blowing of air conditioning air.

Figure 1:
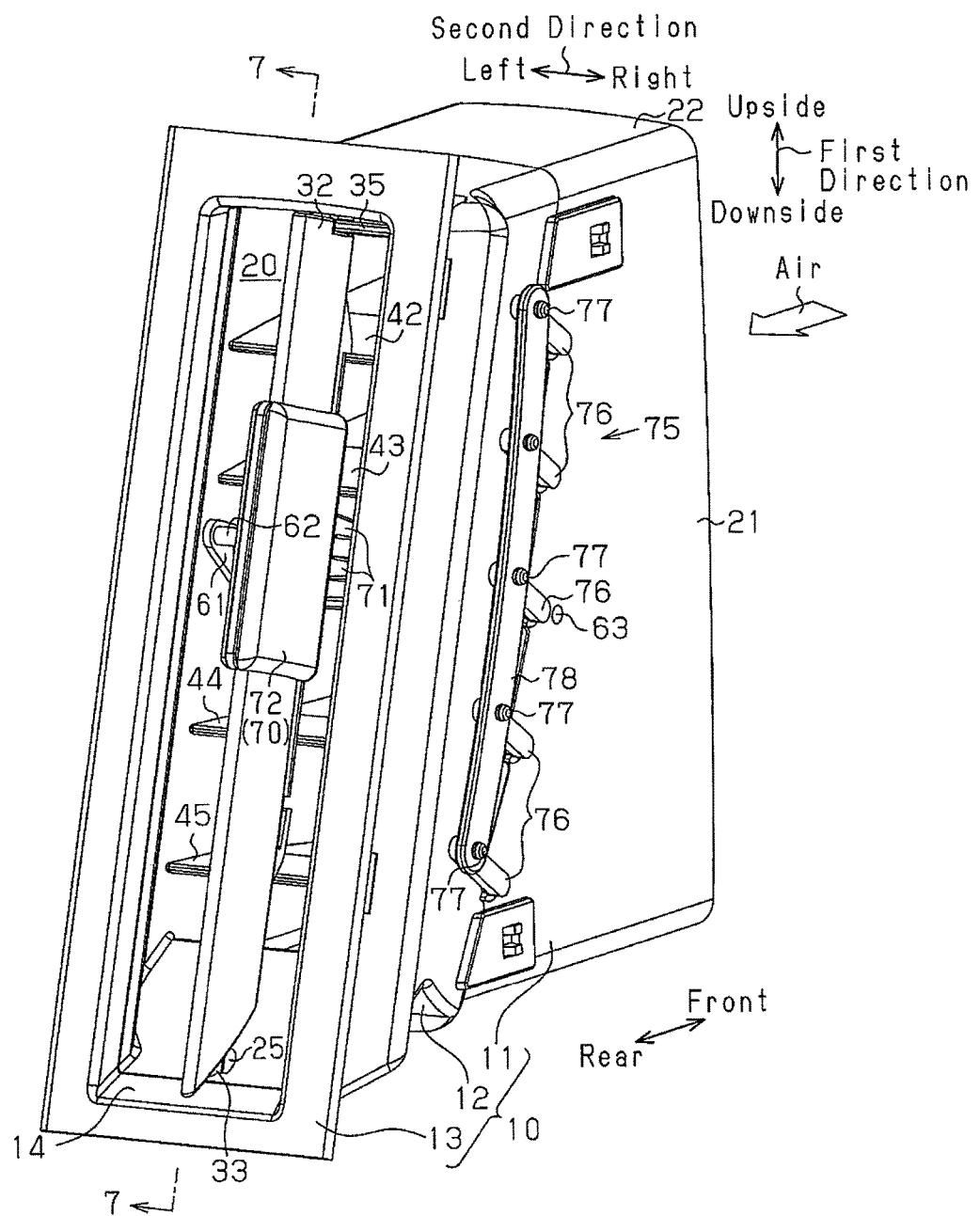
FIG. 1 is a perspective view of an air conditioning register according to a first embodiment, showing a state where upstream fins are arranged substantially horizontally.
Figure 2:
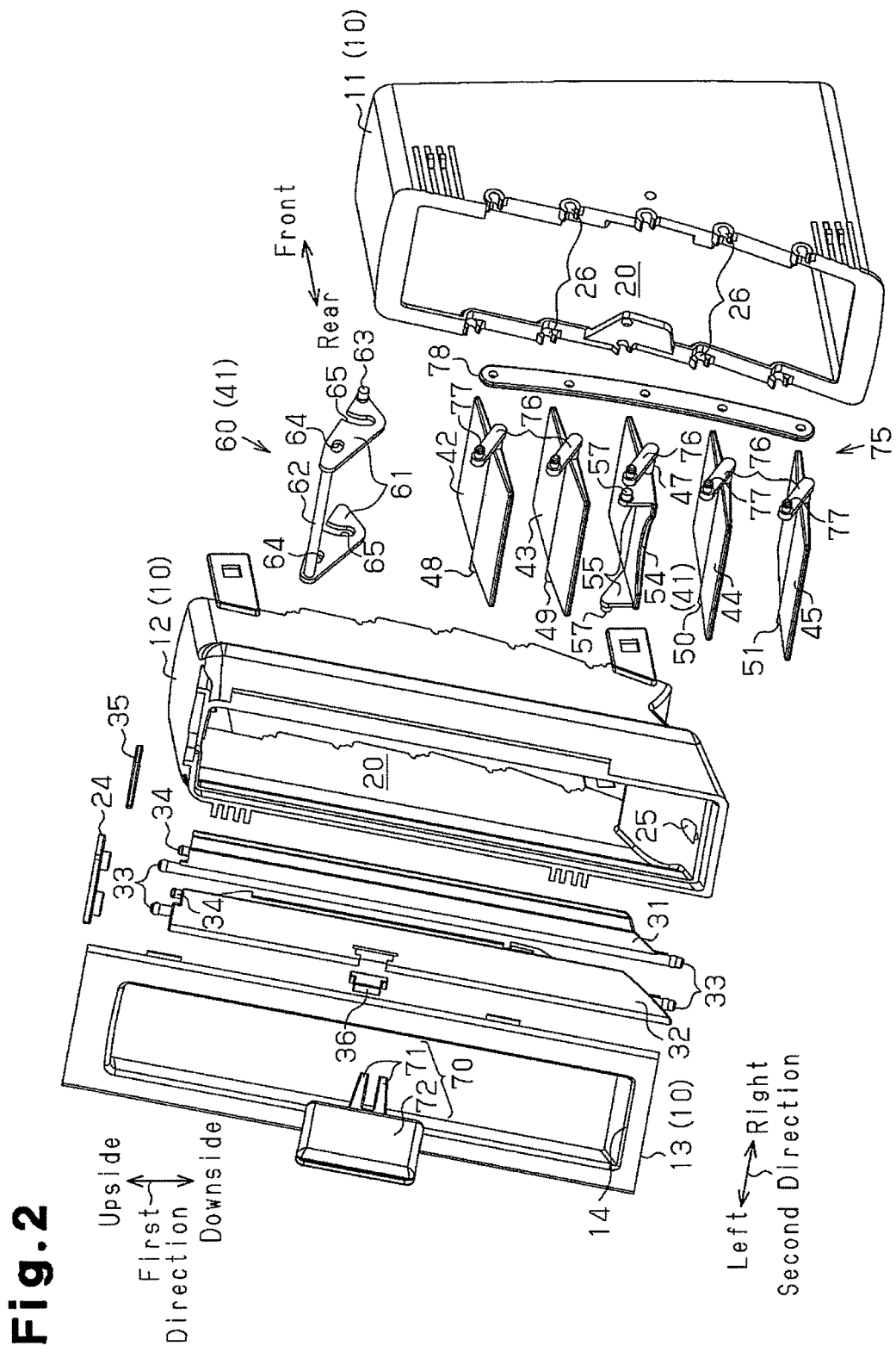
FIG. 2 is an exploded perspective view of the air conditioning register shown in FIG. 1.

As shown in FIGS. 1 and 2, the air conditioning register includes a case 10, a group of downstream fins, a group of upstream fins, an operation knob 70, and a link mechanism 75. The components of the air conditioning register will next be described.

<Case 10>

The case 10 is configured to provide communication between a ventilation duct (not shown) of the air conditioner and an opening (not shown) formed in the instrument panel. The case 10 includes an upstream retainer 11, a downstream retainer 12, and a bezel 13. The case 10 is formed in a substantially rectangular cylindrical shape with both ends being opened and the horizontal dimension (in the vehicle width direction) being smaller than the vertical dimension (in the vertical direction). The interior space of the case 10 forms a passage for air conditioning air to flow therethrough (hereinafter referred to as "ventilation passage 20").

On a plane perpendicular to the direction of flow of the air conditioning air in the ventilation passage 20, one of two mutually perpendicular directions is defined as a first direction and the other is defined as a second direction. In this first embodiment, the vertical direction is defined as first direction and the vehicle width direction (lateral direction) is defined as second direction. The "direction of airflow" herein means the direction in which the air conditioning air flows before being redirected by the group of downstream and the group of upstream fins. As for the positional relationship of the components of the air conditioning register, the direction approaching a central portion of the ventilation passage 20 is defined as an "inward direction" and "inward," while the direction away from the central portion is defined as "outward direction" and "outward."

The upstream retainer 11 constitutes the most upstream part of the case 10. The downstream retainer 12 is located downstream of the upstream retainer 11. The upstream end portion of the downstream retainer 12 is coupled to the downstream end portion of the upstream retainer 11. The bezel 13 constitutes an ornamental surface of the air conditioning register. The bezel 13 is located in the most downstream part of the case 10 and coupled to the downstream end portion of the downstream retainer 12. The bezel 13 has the shape of an oblong quadrilateral frame and has an outlet port 14 through which the air conditioning air is supplied.

The ventilation passage 20 is surrounded by four walls of the case 10. The four walls include a pair of first walls 21 extending substantially parallel with each other and opposed in the second direction and a pair of second walls 22 extending substantially parallel with each other and opposed in the first direction.

Figure 5:
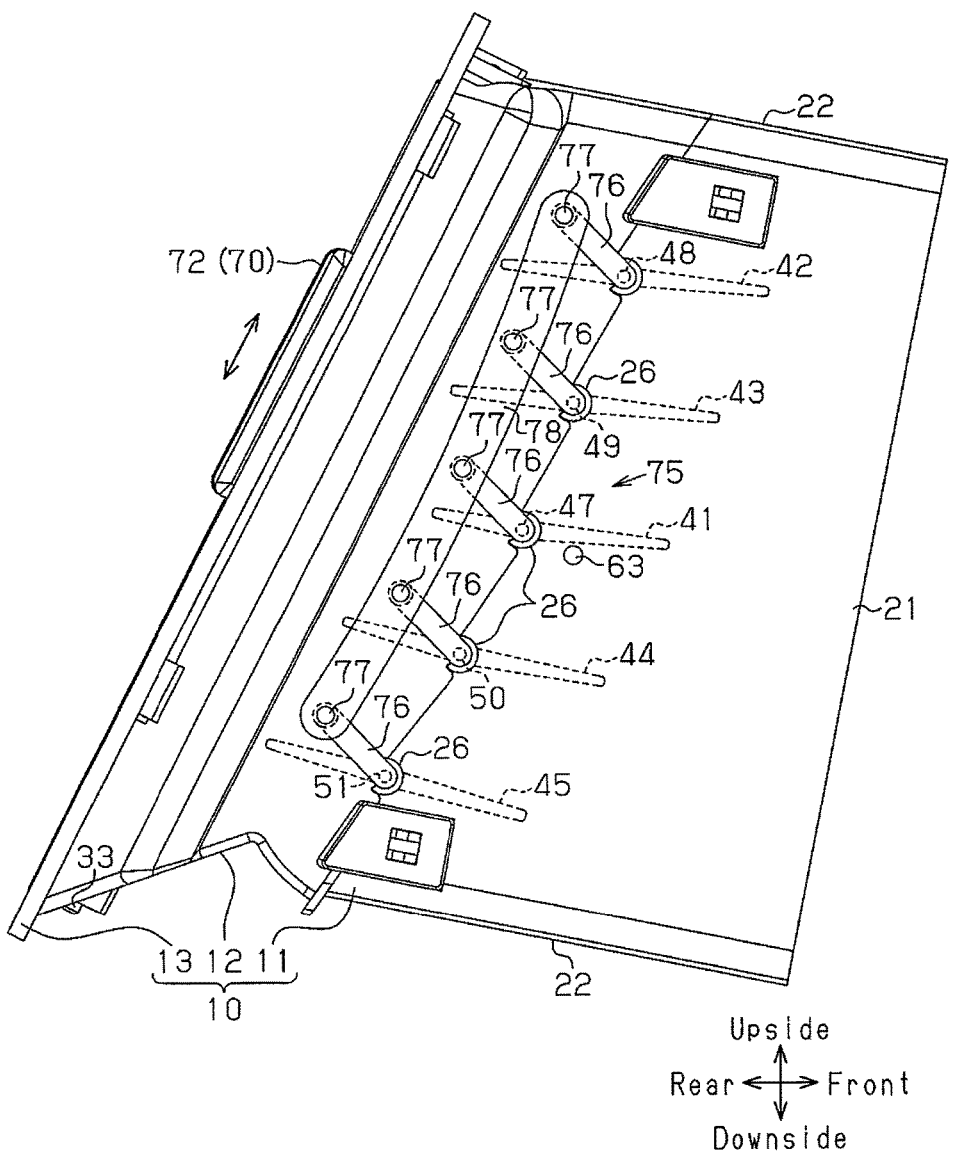
FIG. 5 is a side view of the air conditioning register shown in FIG. 1.

As shown in FIG. 5, the bezel 13 and the outlet port 14 are inclined with respect to the second walls 22 such that the lower parts thereof are positioned further downstream from the upper parts.

Figure 7:
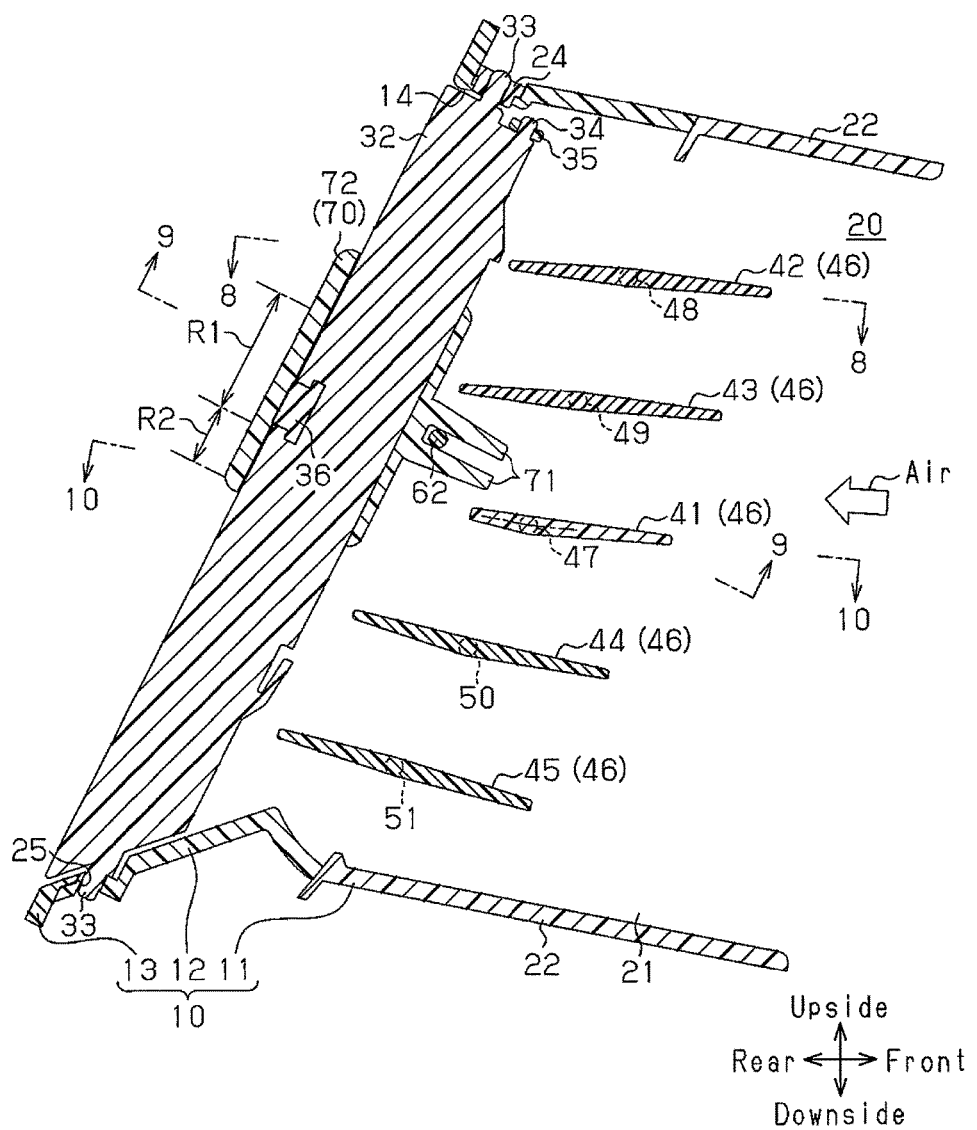
FIG. 7 is a cross-sectional view taken along line 7-7 of FIG. 1.
Figure 8:
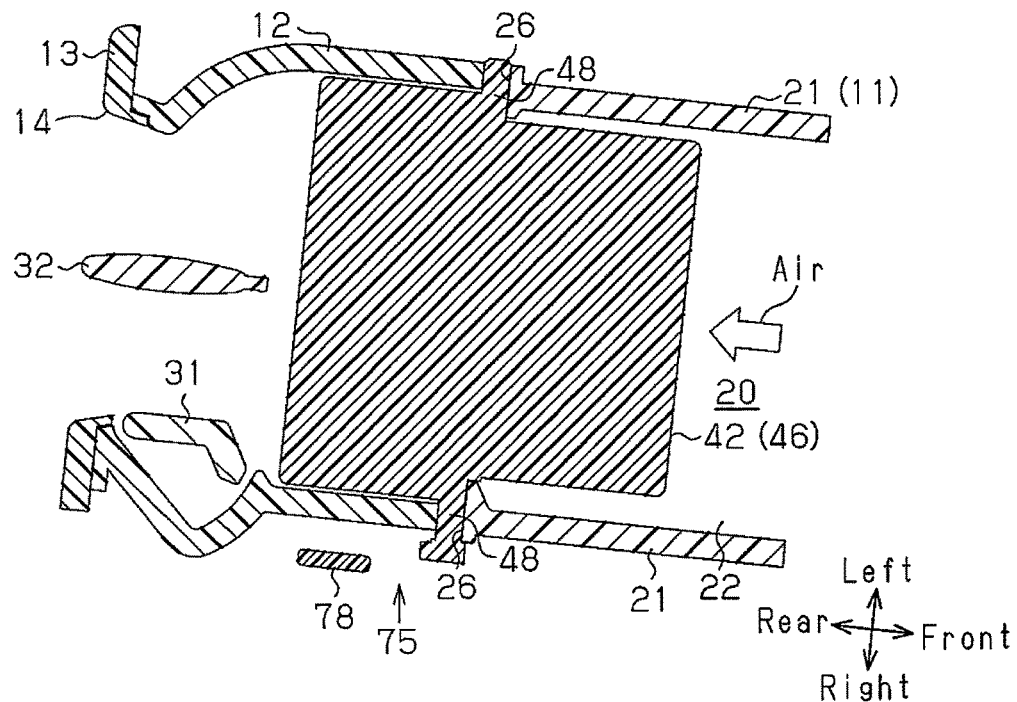
FIG. 8 is a cross-sectional view taken along line 8-8 of FIG. 7.
Figure 9:
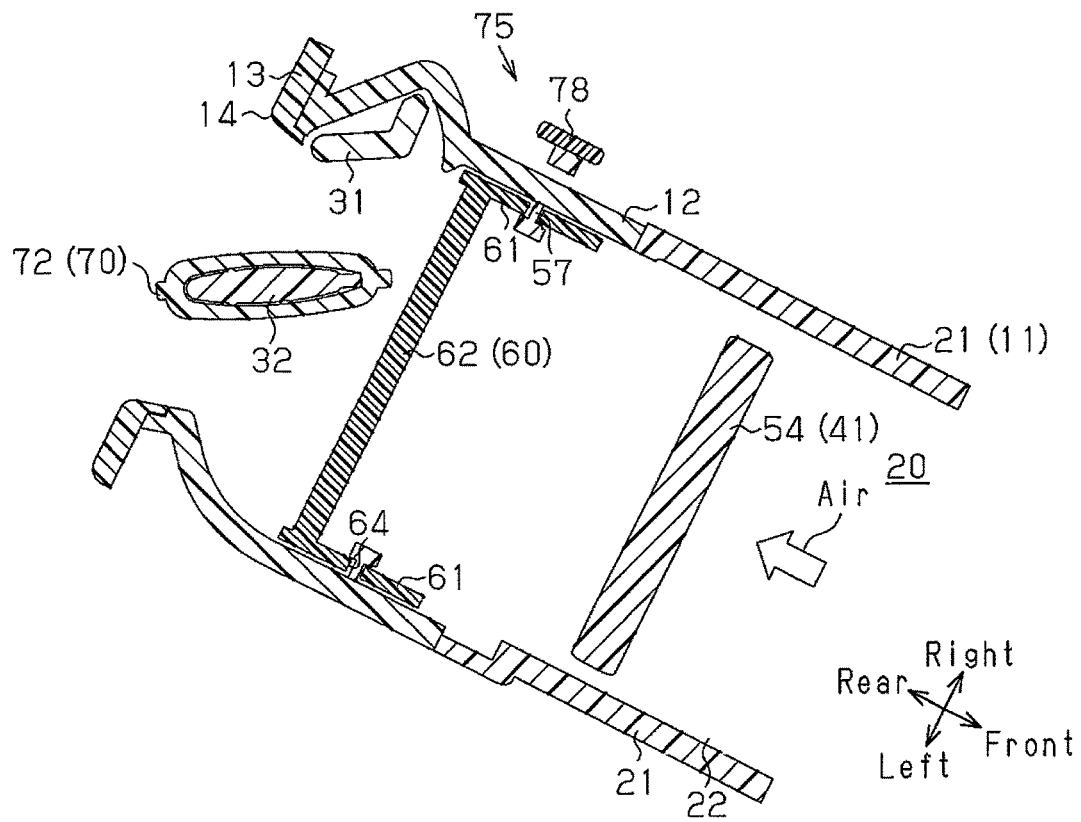
FIG. 9 is a cross-sectional view taken along line 9-9 of FIG. 7.
Figure 10:
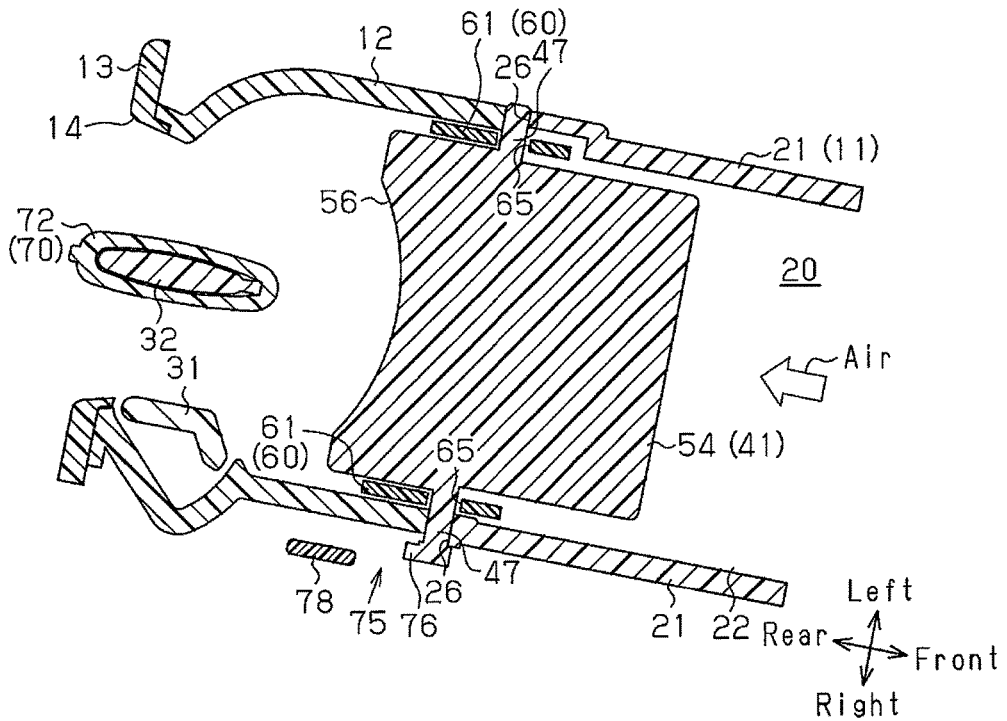
FIG. 10 is a cross-sectional view taken along line 10-10 of FIG. 7.

As shown in FIGS. 2 and 7, an upper downstream bearing 24 is located on the upper second wall 22 at a position slightly away upstream from the outlet port 14. Similarly, two lower downstream bearings 25 are located in the lower second wall 22 at a position slightly away upstream from the outlet port 14. The lower downstream bearings 25 are located in a central portion in the second direction and in the vicinity of one of the pair of first walls 21 (the right one in FIG. 1).

Multiple upstream bearings 26 are provided at multiple positions in each of the first walls 21. The multiple upstream bearings 26 in each of the first walls 21 are located in the boundary portion between the upstream retainer 11 and the downstream retainer 12 in a manner separated at substantially even intervals in the first direction.

<Group of Downstream Fins>

As shown in FIGS. 2 and 8 to 10, the group of downstream fins includes a downstream fin 31 having a bent cross-sectional shape and extending in the first direction and a downstream fin 32 having a non-bent cross-sectional shape and extending in the first direction. The downstream fins 31 and 32 each have a pair of downstream fin shafts 33 protruding outward from the respective end faces in the first direction. The downstream fin shafts 33 of the downstream fins 31 and 32 are supported rotationally on the respective downstream bearings 24 and 25. The downstream fins 31 and 32 are thus pivotally supported by the second walls 22 such that the downstream ends thereof can move in the second direction.

As shown in FIGS. 2 and 7, coupling shafts 34 extending upward are formed at positions displaced upstream from the downstream fin shafts 33 on top of the downstream fins 31 and 32. The coupling shafts 34 of the downstream fins 31 and 32 are coupled via an elongated downstream coupling rod 35 extending in the second direction. The downstream fins 31 and 32, the downstream fin shafts 33, the coupling shafts 34 and the downstream coupling rod 35 constitute a link mechanism. The link mechanism is configured to tilt the downstream fin 31 in synchronization with the downstream fin 32.

On the downstream fin 32, an elastic body 36 such as rubber is mounted in a middle portion in the axial direction of the downstream fin shafts 33. The elastic body 36 is configured to be in contact with the operation knob 70 to apply an operating load on the operation knob 70 when the operation knob 70 is operated to slide along the downstream fin 32.

<Group of Upstream Fins>

The group of upstream fins includes one specific upstream fin 41 and multiple (four) normal upstream fins 42 to 45. The specific upstream fin 41 and the normal upstream fins 42 to 45 are arranged further upstream from the downstream fins 31 and 32 and spaced in the first direction. The specific upstream fin 41 is located in a substantially central portion of the ventilation passage 20 in the first direction.

In order to distinguish the multiple normal upstream fins 42 to 45, one of a pair of upper and lower normal upstream fins 43 and 44 adjacent to the specific upstream fin 41 (the lower normal upstream fin in this embodiment) is referred to as adjacent normal upstream fin 44. The normal upstream fins located farther from the adjacent normal upstream fin 44 than the specific upstream fin 41, that is, the two normal upstream fins located above the specific upstream fin 41 are referred to as first normal upstream fins 42 and 43. The normal upstream fin located farther from the specific upstream fin 41 than the adjacent normal upstream fin 44, that is, the normal upstream fin located below the adjacent normal upstream fin 44 is referred to as second normal upstream fin 45.

In the case where there is no need to particularly distinguish the first normal upstream fins 42 and 43, the adjacent normal upstream fin 44, and the second normal upstream fin 45, these fins are referred to simply as "normal upstream fins 42 to 45." In the case where there is no need to particularly distinguish the specific upstream fin 41 and the normal upstream fins 42 to 45, these fins are referred to simply as "upstream fins 41 to 45."

The specific upstream fin 41 and the normal upstream fins 42 to 45 each have a plate portion 46 extending in the second direction and in the direction of airflow. The plate portion 46 each has substantially the same dimension in the second direction and in the direction of airflow.

Pairs of upstream fin shafts 47 to 51 protrude outward in the second direction from the end faces of each of the plate portions 46 in the second direction. In order to distinguish the upstream fin shafts 47 to 51, the pair corresponding to the specific upstream fin 41 is referred to as upstream fin shafts 47, and the pairs corresponding to the respective normal upstream fins 42 to 45 are referred to, respectively, as upstream fin shafts 48, 49, 50, and 51.

The respective upstream fin shafts 47 to 51 are located in a substantially central portion of the respective plate portions 46 in the direction of airflow. The upstream fin shafts 47 of the specific upstream fin 41 and the upstream fin shafts 48 to 51 of the normal upstream fins 42 to 45 are rotationally supported on the above-described upstream bearings 26. The specific upstream fin 41 and the normal upstream fins 42 to 45 are thus pivotally supported by the first walls 21 such that the downstream ends thereof can move in the first direction.

Figure 3:
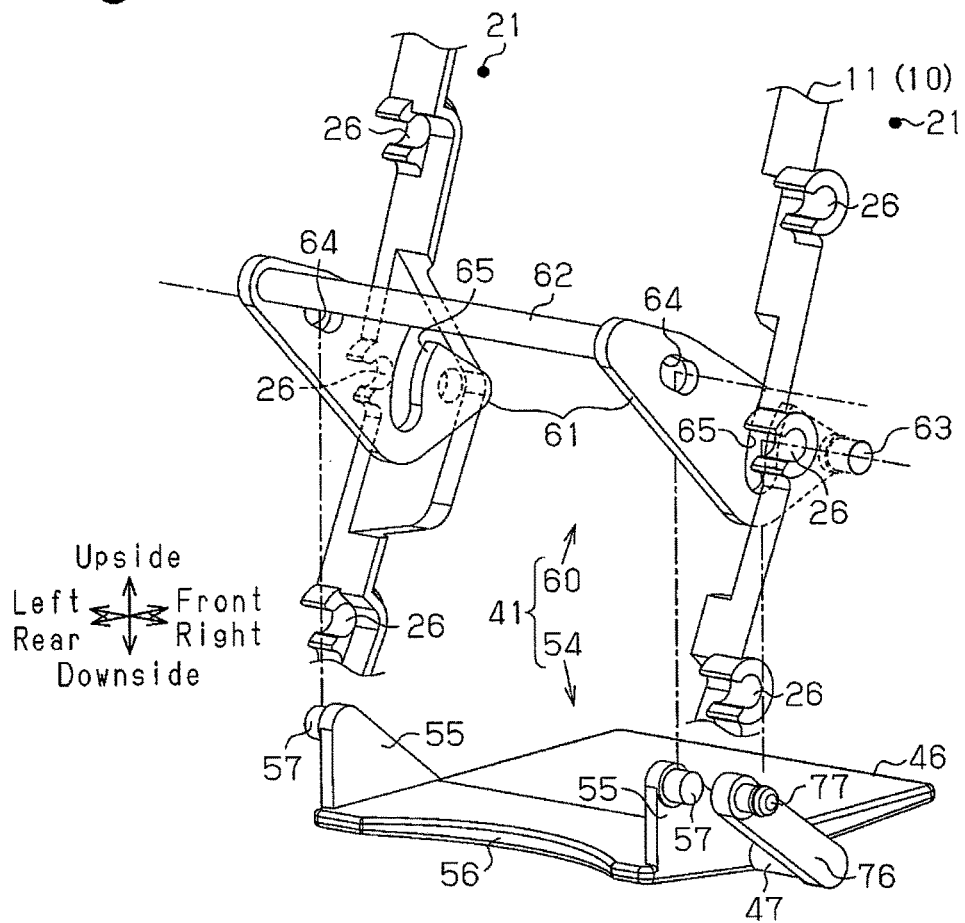
FIG. 3 is a partially exploded perspective view of the first embodiment, showing a fin main body and a transmission body as components of a specific upstream fin and a part of a case in which the components are assembled.
Figure 4:
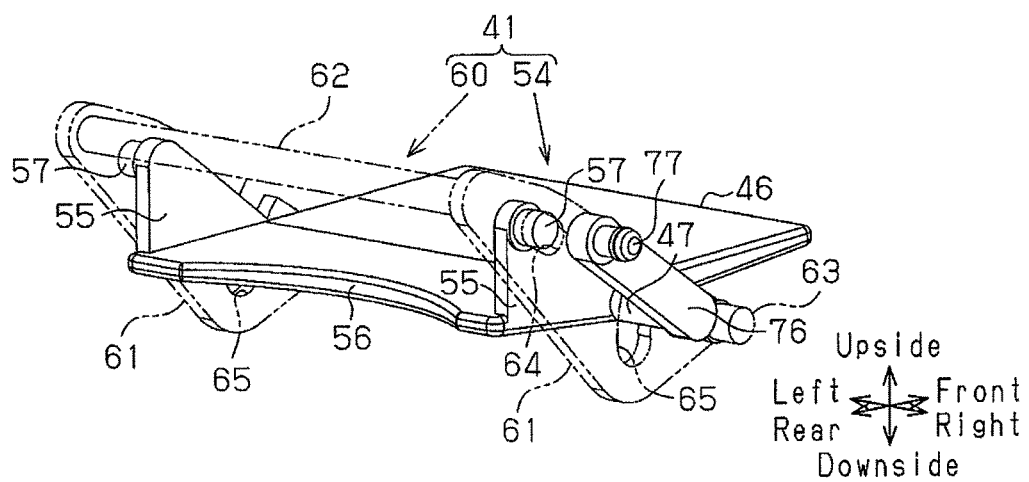
FIG. 4 is a perspective view of the specific upstream fin according to the first embodiment.

The normal upstream fins 42 to 45 are each formed of one component. As shown in FIGS. 3 and 4, the specific upstream fin 41 is dividable into a fin main body 54 and a transmission body 60. The fin main body 54 includes a pair of projecting sections 55 and a pair of engaging portions in addition to the plate portion 46 and the upstream fin shafts 47. A recess 56 is formed in the downstream end of the plate portion 46 in a manner recessed toward the upstream side. The recess 56 is provided to avoid the interference between a fork portion 71 and the plate portion 46 when the operation knob 70 is operated to slide along the downstream fin 32 in the axial direction of the downstream fin shafts 33 (in the substantially vertical direction).

The projecting sections 55 are provided in the side portions of the plate portion 46 in the second direction. The projecting sections 55 protrude upward from the plate portion 46 at positions further downstream from the upstream fin shafts 47. The engaging portions are constituted by engageable protrusions 57 protruding outward in the second direction from downstream end upper parts of the respective projecting sections 55.

The transmission body 60 includes a pair of tilt plate portions 61 located in the vicinity of the inside surfaces of the respective first walls 21 of the case 10 and sandwiching the plate portion 46 therebetween in the axial direction of the upstream fin shafts 47. A transmission shaft portion 62 is bridged parallel with the upstream fin shafts 47 between the downstream end portions of the tilt plate portions 61.

Pivots 63 are provided in the upstream ends of the respective tilt plate portions 61 in a manner protruding outward from the tilt plate portions 61 in the second direction. The pivots 63 are displaced upstream from the upstream fin shafts 47, and the transmission body 60 is pivotally supported by the first walls 21 of the case 10 via the pivots 63.

In each of the tilt plate portions 61, an elongated hole 64 serving as a receiving portion is formed between the transmission shaft portion 62 and the pivot 63. The respective elongated holes 64 are opened toward the pivots 63, and the engageable protrusions 57 are engaged movably with the elongated holes 64.

Also, in each of the tilt plate portions 61, a cut-out portion 65 is formed between the pivot 63 and the elongated hole 64 in a manner extending downward in an arc shape from the upper end edge of that tilt plate portion 61. The upstream fin shafts 47 are located movably in the cut-out portions 65. The cut-out portions 65 are provided to avoid the interference between the upstream fin shafts 47 and the tilt plate portions 61.

Further, FIG. 6A illustrates the upstream fins 41 to 45 shown in FIG. 5. As shown in FIGS. 5 and 6A, the normal upstream fins 42 to 45 are inclined with respect to the specific upstream fin 41 such that the distance between the normal upstream fins 42 to 45 and the specific upstream fin 41 decreases toward the downstream side. That is, upon adjusting the direction of flow of the air conditioning air, the first normal upstream fins 42 and 43 are inclined with respect to the specific upstream fin 41 such that the distance between the first normal upstream fins 42 and 43 and the specific upstream fin 41 decreases toward the downstream side. The angle between the first normal upstream fins 42 and 43 and the specific upstream fin 41 is defined as first inclination angle $\theta 1$. In other words, the angle between a straight line L11 parallel to the specific upstream fin 41 and a straight line L12 extending along the first normal upstream fins 42 and 43 is the first inclination angle $\theta 1$.

The adjacent normal upstream fin 44 and the second normal upstream fin 45 are also inclined with respect to the specific upstream fin 41 such that the distance between the adjacent normal upstream fin 44 and the second normal upstream fin 45 and the specific upstream fin 41 decreases toward the downstream side. The angle between the adjacent normal upstream fin 44 and the second normal upstream fin 45 and the specific upstream fin 41 is defined as second inclination angle θ2. In other words, the angle between the straight line L11 and a straight line L13 extending along the adjacent normal upstream fin 44 and the second normal upstream fin 45 is the second inclination angle θ2.

Further, FIG. 6B illustrates the positional relationship of the upstream fin shafts 47 to 51 shown in FIG. 6A. As shown in FIGS. 6A and 6B, the line passing through the upstream fin shafts 47 and 50 of the specific upstream fin 41 and the adjacent normal upstream fin 44 is defined as a reference line L0.

The straight line passing through the upstream fin shaft 47 of the specific upstream fin 41 and inclined toward the downstream side (leftward in FIGS. 6A and 6B) with respect to the reference line L0 by an angle depending on the first inclination angle θ1 (equal to the first inclination angle θ1 in this embodiment) is defined as a first inclined line L21. The line passing through the upstream fin shaft 50 of the adjacent normal upstream fin 44 and inclined toward the downstream side with respect to the reference line L0 by an angle depending on the second inclination angle θ2 (equal to the second inclination angle θ2 in this embodiment) is defined as a second inclined line L22.

The upstream fin shafts 48 and 49 of the first normal upstream fins 42 and 43 lie on the first inclined line L21 and are arranged in a manner displaced toward the downstream side from the reference line L0. The upstream fin shaft 51 of the second normal upstream fin 45 lies on the second inclined line L22 and is also arranged in a manner displaced toward the downstream side from the reference line L0.

In FIG. 6B, the bent thick line connecting the adjacent upstream fin shafts 47 to 51 corresponds to a coupling rod 78.

<Operation Knob 70>

As shown in FIGS. 1 and 7, the operation knob 70 mainly includes a main body portion 72 fitted on the downstream fin 32 in a manner slidable in the axial direction of the downstream fin shafts 33.

The main body portion 72 is formed integrally with the pair of fork portions 71 extending toward the upstream side. The fork portions 71 are both separated from each other at a certain interval in the axial direction of the downstream fin shafts 33 and hold the transmission shaft portion 62 therebetween in the axial direction of the downstream fin shafts 33.

The dimension of the fork portions 71 in the axial direction of the downstream fin shafts 33 is smaller than that of the main body portion 72 in the same direction. The dimension of the fork portions 71 in the second direction (lateral direction) is substantially the same as that of the main body portion 72 in the same direction. The dimension of the fork portions 71 in the direction of airflow (longitudinal direction) is set to the minimum length capable of holding the transmission shaft portion 62 therebetween regardless of the vertical position of the main body portion 72 (with which the transmission shaft portion 62 cannot escape the fork portions 71).

The operation knob 70 is slidably operable in a normal movable range R1 and a specified movable range R2. In the normal movable range R1, the operation knob 70 is operated to slide when the upstream fins 41 to 45 are tilted to adjust the direction of flow of the air conditioning air. In the specified movable range R2, the operation knob 70 is operated to slide when the upstream fins 41 to 45 are used to close the ventilation passage 20. The specified movable range R2 lies continuously below the normal movable range R1. In FIGS. 7, 12, 15, and 18, the normal movable range R1 and the specified movable range R2 are shown as ranges within which the central portion of the main body portion 72 moves in the axial direction of the downstream fin shafts 33.

<Link Mechanism 75>

As shown in FIGS. 1 and 5, one of the pair of upstream fin shafts 47 of the specific upstream fin 41 (the right one in FIG. 1) partially protrudes outward in the second direction from the corresponding first wall 21. Similarly, one of each pair of upstream fin shafts 48 to 51 of the normal upstream fins 42 to 45 (the right ones in FIG. 1) partially protrudes outward in the second direction from the first wall 21. Elongated arms 76 extending in a direction perpendicular to the upstream fin shafts 47 to 51 are formed in outer end portions of the respective upstream fin shafts 47 to 51. The arms 76 are common to the specific upstream fin 41 and the normal upstream fins 42 to 45. When the upstream fins 41 to 45 are each arranged substantially horizontally, the arms 76 are inclined such that the height thereof increases toward the downstream side.

As shown in FIGS. 2 and 5, pins 77 protrude outward in the second direction at the downstream ends of the respective arms 76. The distances of the arms 76 between the upstream fin shafts 47 to 51 and the pins 77 are common to the specific upstream fin 41 and the normal upstream fins 42 to 45. The pins 77 of the respective arms 76 are located in the vicinity of the outside surface of the first wall 21 of the case 10 and coupled via the coupling rod 78 extending in the first direction. The upstream fins 41 to 45, the upstream fin shafts 47 to 51, the arms 76, the pins 77, and the coupling rod 78 constitute the link mechanism 75.

The air conditioning register according to the first embodiment is configured as described heretofore. Next will be described the action of the air conditioning register.

In the air conditioning register, as shown in FIGS. 1 and 7, the air conditioning air is redirected through the upstream fins 41 to 45 and the downstream fins 31 and 32 and then blown out from the outlet port 14.

When a force in the thickness direction of the downstream fin 32 is applied to the main body portion 72 of the operation knob 70, the downstream fin 32 is tilted in the same direction with the downstream fin shafts 33 as a fulcrum. This tilt is transmitted via the coupling shaft 34 and the downstream coupling rod 35 to the coupling shaft 34 of the downstream fin 31. This transmission results in that the downstream fin 31 is tilted in conjunction with the downstream fin 32.

In the case above, the fork portions 71 move along the transmission shaft portion 62 in the first direction while sandwiching the transmission shaft portion 62 therebetween. Thus, the movement of the fork portions 71 cannot be transmitted to the transmission shaft portion 62, and therefore the specific upstream fin 41 and all of the normal upstream fins 42 to 45 cannot be tilted. The air conditioning air is redirected in the second direction to flow along the tilted downstream fins 31 and 32.

Next will be described an action when the operation knob 70 is operated along the downstream fin 32 to slide in the axial direction of the downstream fin shafts 33, separately for the cases: (i) where the operation knob 70 is operated to slide in the normal movable range R1 and (ii) where the operation knob 70 is operated to slide in the specified movable range R2.

(i) Where the operation knob 70 is operated to slide in the normal movable range R1

Figure 11:
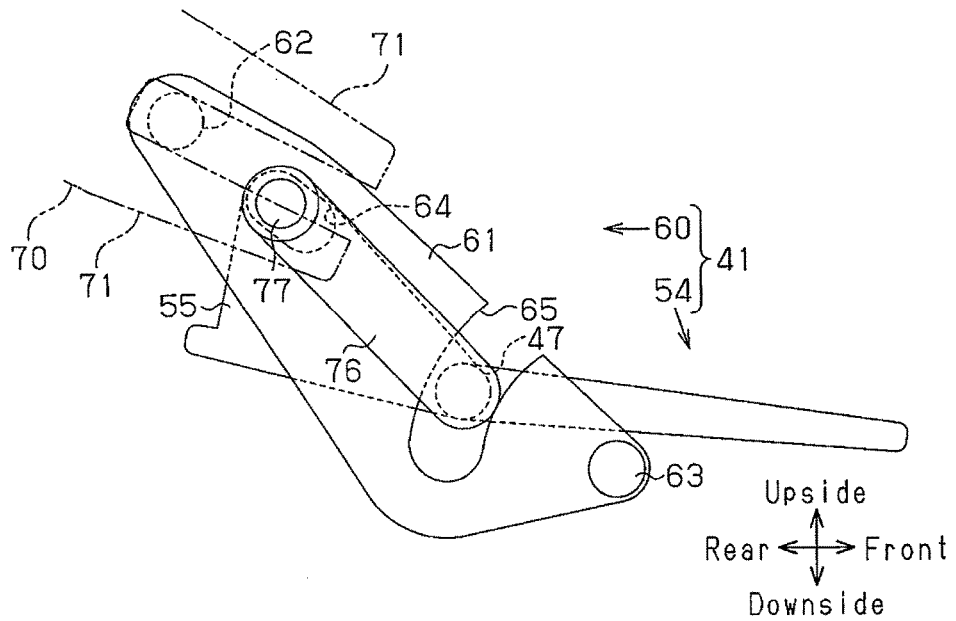
FIG. 11 is a partial side view of the specific upstream fin with the fin main body arranged substantially horizontally, shown together with an operation knob, according to the first embodiment.

FIGS. 7 and 11 show a state of the components of the air conditioning register when the operation knob 70 is placed at a middle portion of the normal movable range R1. The position of the operation knob 70 at this time is referred to as the "reference position." All of the upstream fins 41 to 45 are substantially arranged horizontally (substantially parallel with the second walls 22). The position of the respective upstream fins 41 to 45 at this time is referred to as the "neutral position." The air conditioning air flows along the upstream fins 41 to 45 and the second walls 22.

Also at this time, the arms 76 are inclined such that the height thereof increases toward the downstream side.

Figure 12:
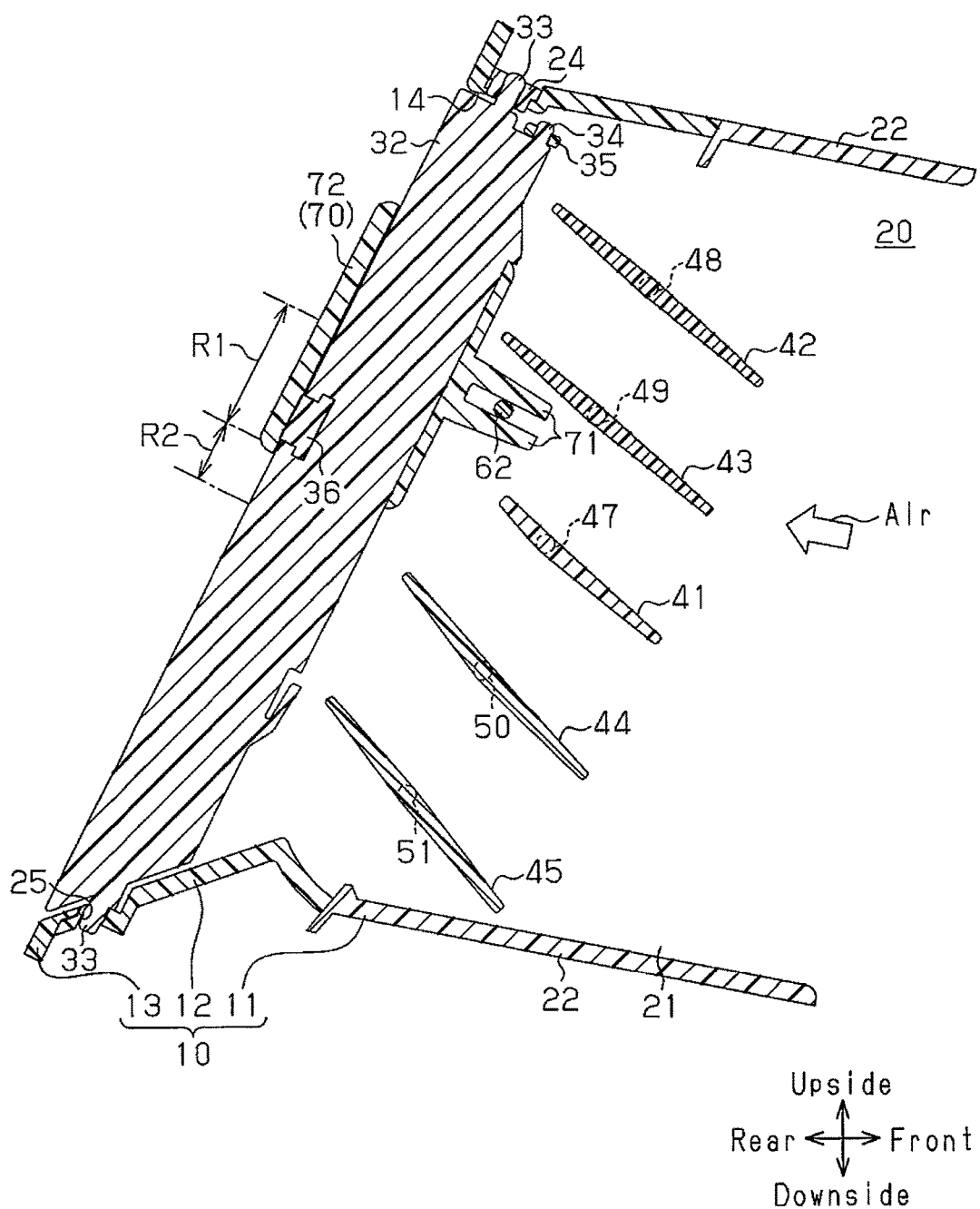
FIG. 12 is a side cross-sectional view corresponding to FIG. 7, showing the internal structure of the air conditioning register in which the upstream fins are tilted such that the height thereof increases toward the downstream side.
Figure 14:
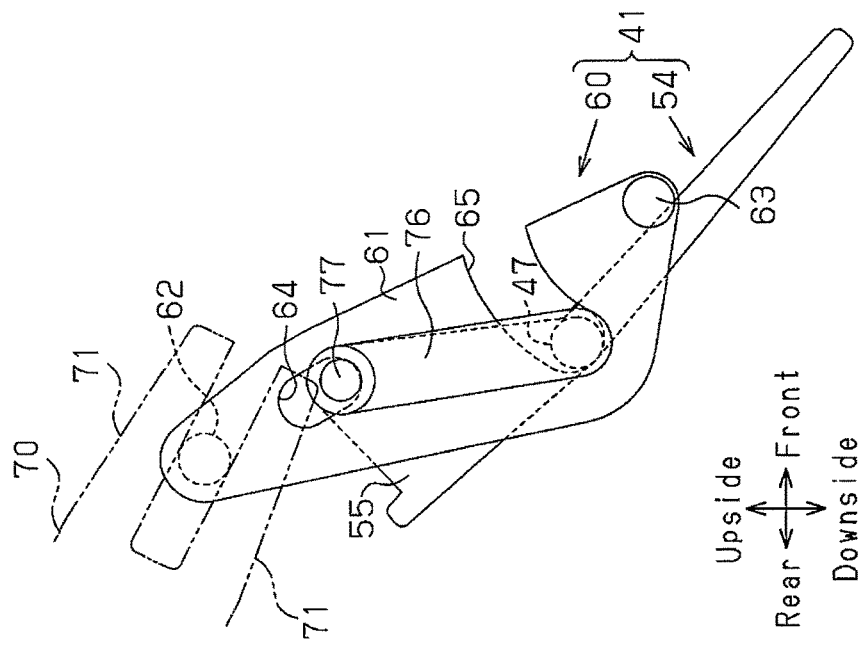
FIG. 14 is a partial side view of the specific upstream fin with the fin main body tilted such that the height thereof increases toward the downstream side, shown together with the operation knob, according to the first embodiment.
Figure 13:
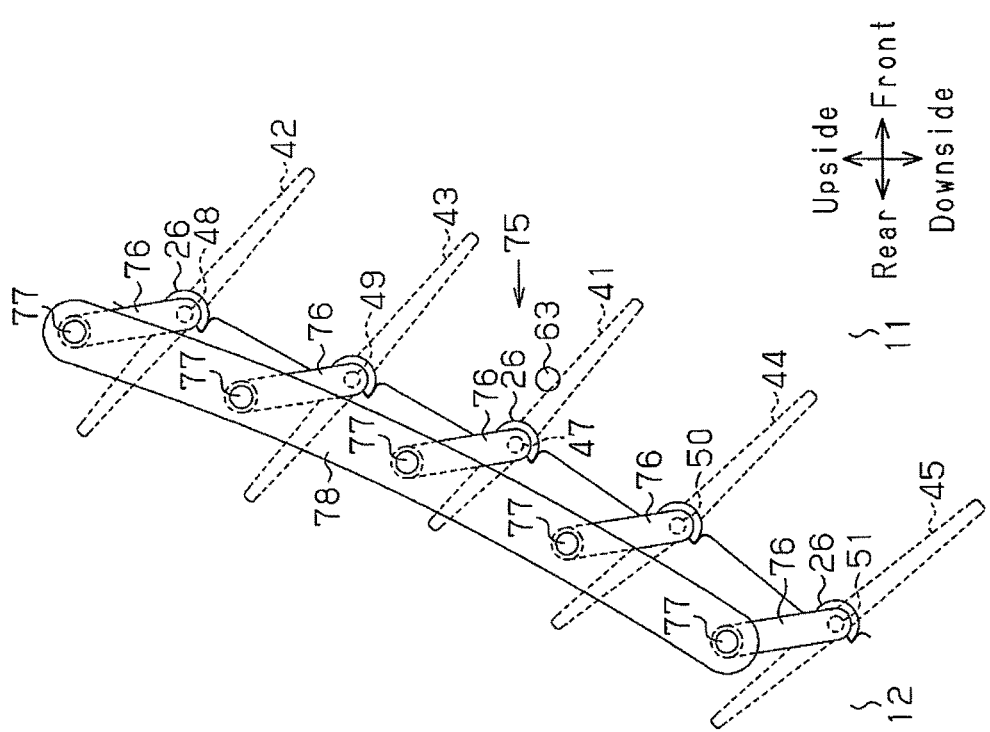
FIG. 13 is a partial side view of the first embodiment, showing a state of the upstream fins and a link mechanism, when the fin main bodies are tilted such that the height thereof increases toward the downstream side.

FIGS. 12 to 14 show a state of each part of the air conditioning register when the operation knob 70 is operated from the above-described reference position to slide upward along the downstream fin 32.

With the sliding operation, the fork portions 71 move upward in the moving direction and the trailing (lower) fork portion 71 presses the transmission shaft portion 62 upward. In the transmission body 60, the pair of tilt plate portions 61, the transmission shaft portion 62 and the pair of pivots 63 operate integrally.

That is, the pressing force that the fork portion 71 applies to the transmission shaft portion 62 is transmitted to both tilt plate portions 61. This transmission results in that the transmission body 60 is tilted upward with the pivots 63 as a fulcrum. As the fork portions 71 move upward, the portion of the transmission shaft portion 62 in contact with the fork portions 71 moves upstream. The tilt of the transmission body 60 is transmitted via the elongated hole 64 and the engageable protrusion 57 to the fin main body 54. This transmission results in that the fin main body 54 is tilted upward from the neutral position with the upstream fin shafts 47 as a fulcrum.

The upward linear motion of the operation knob 70 is thus converted into the upward tilt motion of the specific upstream fin 41 with the upstream fin shafts 47 as a fulcrum. As the fin main body 54 is thus tilted, the engageable protrusion 57 moves upstream within the elongated hole 64. The upstream fin shafts 47 also move deeper into the respective cut-out portions 65.

In addition, the tilt of the specific upstream fin 41 is transmitted via the link mechanism 75 to all of the normal upstream fins 42 to 45. That is, as the specific upstream fin 41 is tilted upward, the arms 76 are also tilted upward with the upstream fin shafts 47 as a fulcrum, whereby the pins 77 rotationally move upward about the upstream fin shafts 47. The movement of the pins 77 of the specific upstream fin 41 is transmitted via the coupling rods 78 to all of the normal upstream fins 42 to 45. The pins 77 of the normal upstream fins 42 to 45 then rotationally move upward about the upstream fin shafts 48 to 51, whereby the arms 76 become tilted steeply.

As a result, in conjunction with the specific upstream fin 41, all of the normal upstream fins 42 to 45 are tilted upward from the neutral position with the upstream fin shafts 48 to 51 as fulcrums to be thereby inclined such that the height thereof increases toward the downstream side. The air conditioning air is thus redirected to flow obliquely upward along the upstream fins 41 to 45.

When the operation knob 70 is operated from the position shown in FIGS. 12 to 14 to slide downward along the downstream fin 32, the respective upstream fins 41 to 45 act in an inverse manner to the action described above.

Figure 15:
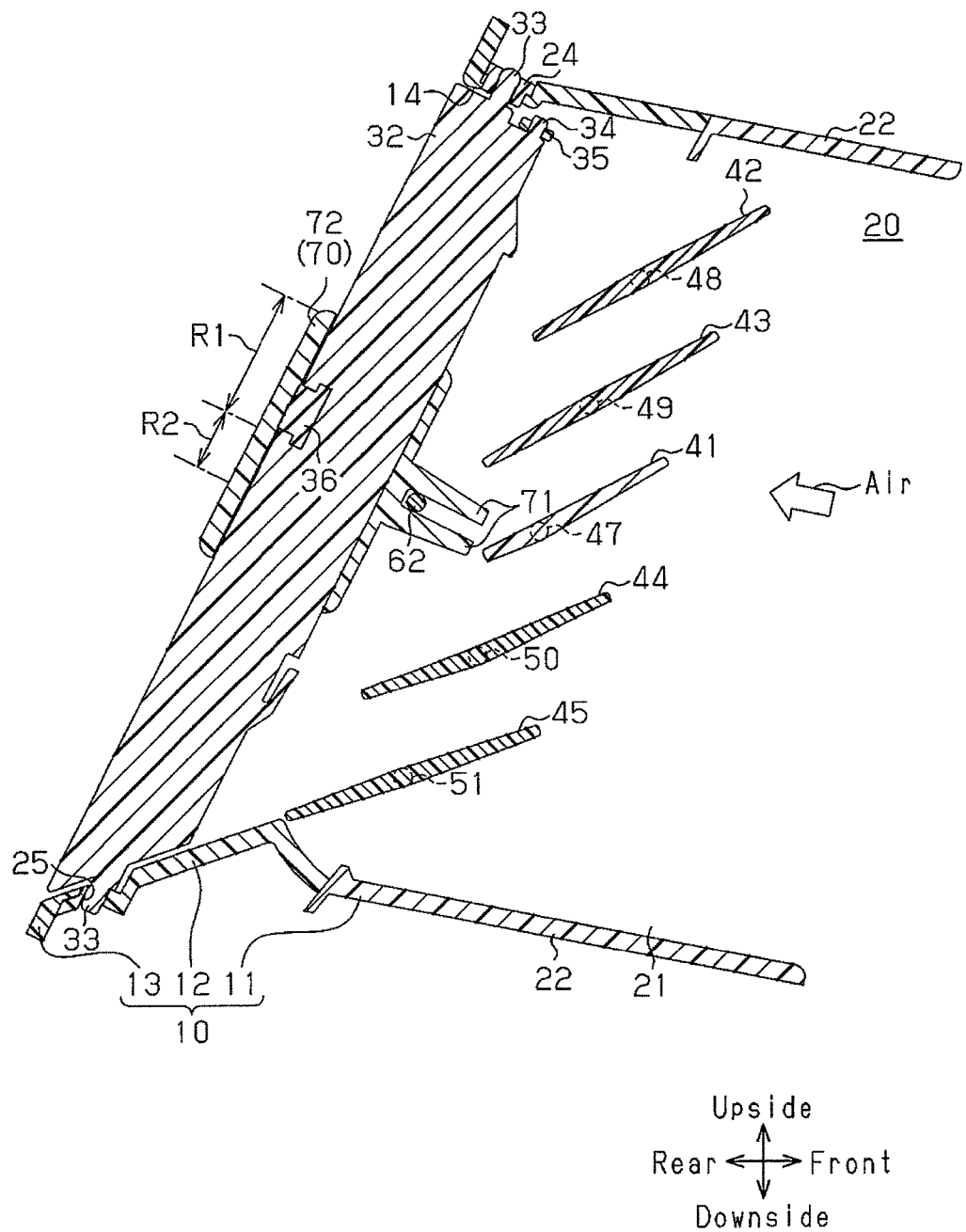
FIG. 15 is a side cross-sectional view corresponding to FIG. 7, showing the internal structure of the air conditioning register in which the fin main bodies are tilted such that the height thereof decreases toward the downstream side.
Figure 16:
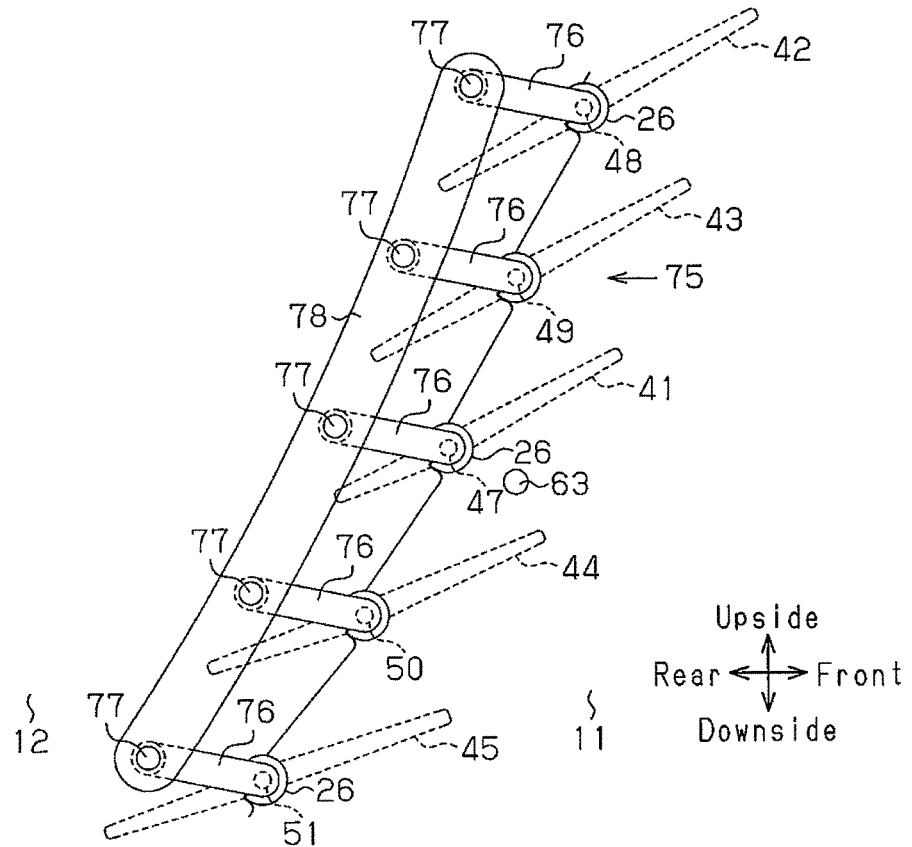
FIG. 16 is a partial side view of the first embodiment, showing a state of the upstream fins and the link mechanism, when the fin main bodies are tilted such that the height thereof decreases toward the downstream side.
Figure 17:
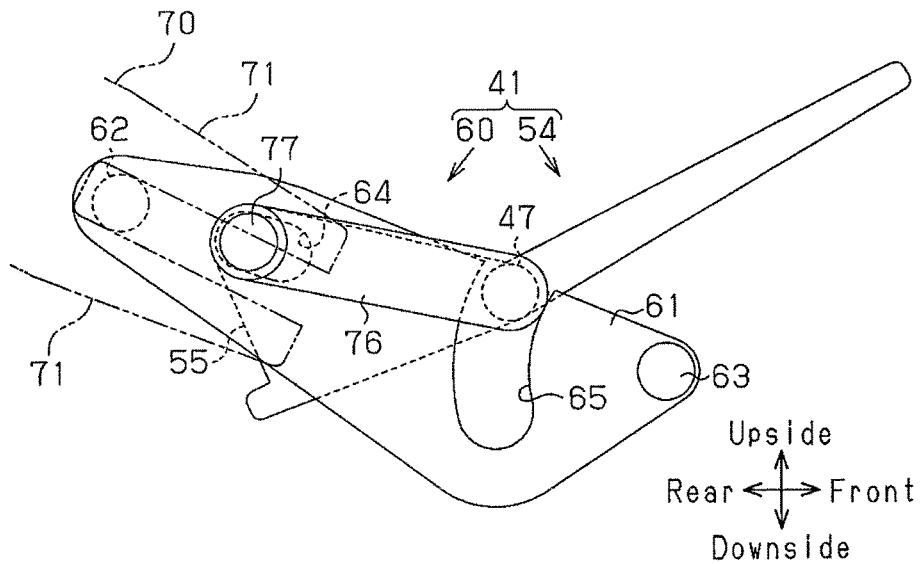
FIG. 17 is a partial side view of the specific upstream fin with the fin main body tilted such that the height thereof decreases toward the downstream side, shown together with the operation knob, according to the first embodiment.

On the other hand, FIGS. 15 to 17 show a state of each part of the air conditioning register when the operation knob 70 is operated from the reference position (see FIG. 7) to slide downward along the downstream fin 32, inversely to the case shown in FIGS. 12 to 14.

With the sliding operation, both of the fork portions 71 move downward and the trailing (upper) fork portion 71 in the moving direction presses the transmission shaft portion 62 downward.

The pressing force applied to the transmission shaft portion 62 is transmitted to both of the tilt plate portions 61, and thus the transmission body 60 is tilted downward with the pivots 63 as fulcrums. Despite the movement of the fork portions 71, the portion of the transmission shaft portion 62 in contact with the fork portions 71 remains about the same as that when the operation knob 70 is placed at the reference position. The tilt of both of the tilt plate portions 61 is transmitted via the elongated hole 64 and the engageable protrusion 57 to the fin main body 54, and the fin main body 54 is tilted downward from the neutral position with the upstream fin shafts 47 as a fulcrum.

In addition, as the specific upstream fin 41 is tilted, the arms 76 are also tilted downward with the upstream fin shafts 47 as fulcrums, whereby the pins 77 rotationally move downward about the upstream fin shafts 47. The movement of the pins 77 is transmitted via the coupling rods 78 to the pins 77 of all of the normal upstream fins 42 to 45, respectively. The pins 77 of the normal upstream fins 42 to 45 then rotationally move downward about the upstream fin shafts 48 to 51, whereby the respective arms 76 become tilted moderately.

As a result, in conjunction with the specific upstream fin 41, all of the normal upstream fins 42 to 45 are tilted downward from the neutral position with the upstream fin shafts 48 to 51 as fulcrums to be thereby inclined such that the height thereof decreases toward the downstream side. The air conditioning air is thus redirected to flow obliquely downward along the upstream fins 41 to 45.

When the operation knob 70 is operated from the position shown in FIGS. 15 to 17 to slide upward along the downstream fin 32, the respective upstream fins 41 to 45 act in an inverse manner to the action described above.

When the operation knob 70 is operated to slide in the normal movable range R1 so that the direction of flow of the air conditioning air is adjusted, the first normal upstream fins 42 and 43 are inclined with respect to the specific upstream fin 41 such that the distance between the first normal upstream fins 42 and 43 and the specific upstream fin 41 decreases toward the downstream side. The adjacent normal upstream fin 44 and the second normal upstream fin 45 are also inclined with respect to the specific upstream fin 41 such that the distance between the adjacent normal upstream fin 44 and the second normal upstream fin 45 and the specific upstream fin 41 decreases toward the downstream side. Accordingly, the air conditioning air flowing along the first normal upstream fins 42 and 43 converges on the air conditioning air flowing along the specific upstream fin 41. The air conditioning air flowing along the adjacent normal upstream fin 44 and the second normal upstream fin 45 also converges on the air conditioning air flowing along the specific upstream fin 41. The thus converged air conditioning air is blown out from the case 10 at a higher flow rate and flows farther from the case 10 than when all of the normal upstream fins 42 to 45 are arranged parallel with the specific upstream fin 41.

(ii) Where the operation knob 70 is operated to slide in the specified movable range R2

Also in this case, each part operates similar to the case where the operation knob 70 is operated to slide in the normal movable range R1.

Figure 18:
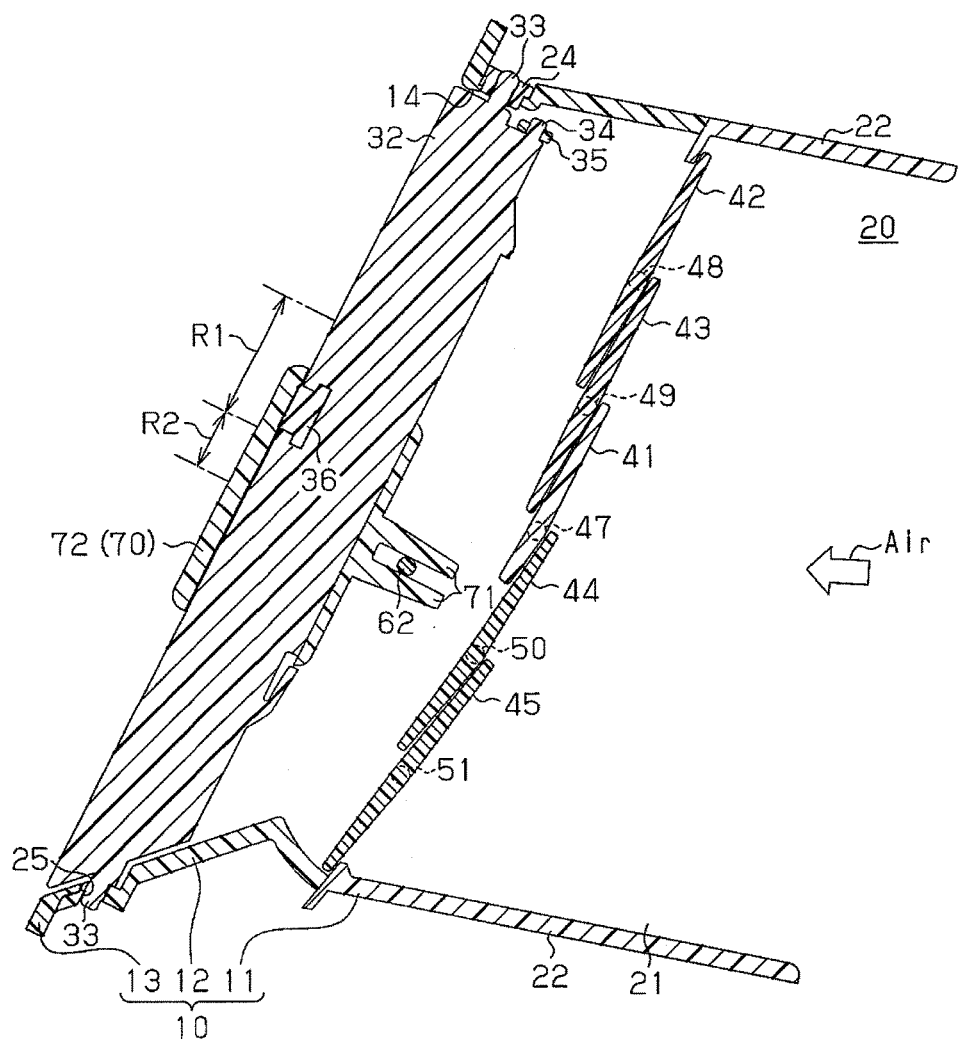
FIG. 18 is a side cross-sectional view corresponding to FIG. 7, showing the internal structure of the air conditioning register in which a ventilation passage is closed with the upstream fins.
Figure 20:
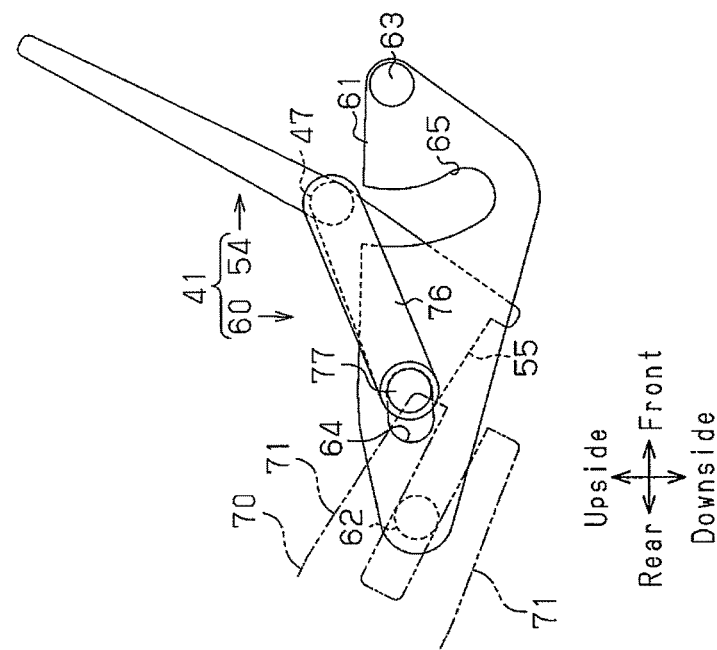
FIG. 20 is a partial side view of the specific upstream fin when the ventilation passage is closed, shown together with the operation knob, according to the first embodiment.
Figure 19:
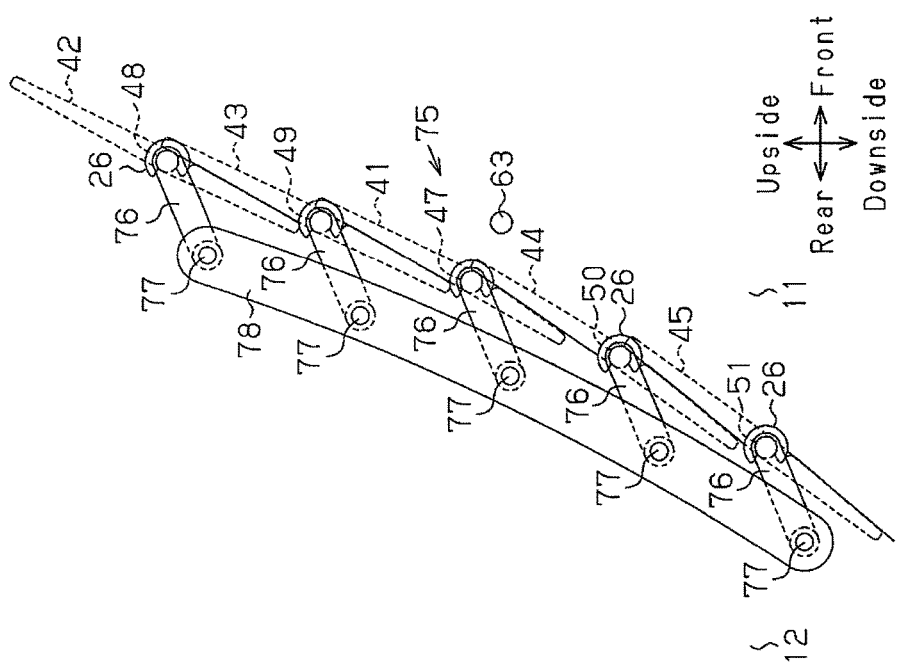
FIG. 19 is a partial side view of the first embodiment, showing a state of the upstream fins and the link mechanism, when the ventilation passage is closed.

When the operation knob 70 is operated to slide to the lower end of the specified movable range R2, the air conditioning register is in the state shown in FIGS. 18 to 20. In this state, the portion of the transmission shaft portion 62 in contact with the fork portions 71 moves upstream. The engageable protrusion 57 is positioned upstream within the elongated hole 64, and the upstream fin shafts 47 escape the respective cut-out portions 65 upward. The arms 76 are inclined such that the height thereof decreases toward the downstream side. Accordingly, the upstream fins 41 to 45 are tilted to be substantially perpendicular to the direction of airflow.

Downstream portions of the upstream fins 41 to 44, which are trailing portions in the tilt direction, are overlaid on upstream portions of the upstream fins 41 and 43 to 45, which are leading portions in the tilt direction. The ventilation passage 20 is substantially closed by all of the upstream fins 41 to 45, whereby the blowing of the air conditioning air through the outlet port 14 is significantly limited.

When the operation knob 70 is operated from the position shown in FIGS. 18 to 20 to slide upward along the downstream fin 32, the respective upstream fins 41 to 45 act in an inverse manner to the action described above.

In general air conditioning registers, here, components arranged within the case 10 can be factors that reduce the actual opening area of the outlet port 14. The actual opening area is an area of a portion on which the components are not projected in a plane perpendicular to the direction of flow of the air conditioning air at the outlet port 14. The portion used to transmit the movement of the operation knob 70 (main body portion 72) to the specific upstream fin 41 can be one of the factors that reduce the actual opening area. The smaller the actual opening area, the higher the ventilation resistance becomes, resulting in an increase in pressure loss and/or noise generation. In order to reduce such a pressure loss and/or noise generation, it is therefore important to reduce the area (projected area) of the portion on which the components within the case 10 are projected in the plane perpendicular to the direction of flow of the air conditioning air at the outlet port 14.

In this regard, the first embodiment employs a configuration in which the pair of fork portions 71 sandwich the transmission shaft portion 62 therebetween. In this configuration, the fork portions 71 are required to have a sufficient length in the direction of airflow so that the transmission shaft portion 62 rotating about the pivots 63 does not escape the fork portions 71. It is, however, not necessary to increase the dimensions of the fork portions 71 in the axial direction of the downstream fin shafts 33 and in the thickness direction of the downstream fin 32 to ensure the engagement between the fork portions 71 and the transmission shaft portion 62. The projected area of the fork portions 71 is thus smaller than that of the rack described in Japanese Patent No. 4055693, whereby the amount of a reduction in the actual opening area by the fork portions 71 is reduced. This allows the resistance (ventilation resistance) of the fork portions 71 when the air conditioning air flows through the ventilation passage 20 to be reduced.

As a comparative example, a specific upstream fin 41 that is not divided into the fin main body 54 and the transmission body 60 is considered. In this case, the transmission shaft portion 62 is arranged coaxially with the engageable protrusions 57 and tilted with the upstream fin shafts 47 as fulcrums. In accordance with this configuration, upon closing the ventilation passage 20 with the upstream fins 41 to 45, it is necessary to tilt the specific upstream fin 41 at a greater angle by operating the operation knob 70 to slide a longer distance and thus rotating with the fork portions 71 the transmission shaft portion 62 about the upstream fin shafts 47 at a greater angle than in the case where the upstream fins are not used to close the ventilation passage (only used to adjust the direction of flow). In this case, the force for rotating the transmission shaft portion 62 about the upstream fin shafts 47 becomes weak. A greater load is therefore required to operate the operation knob 70 in the specified movable range R2.

Figure 21:
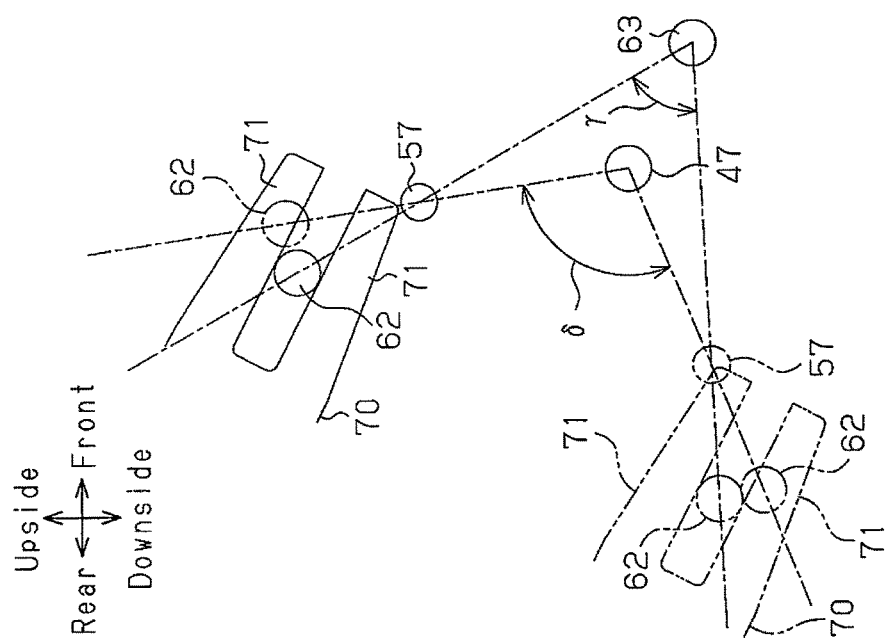
FIG. 21 is a partial side view of the first embodiment, illustrating an action of the operation knob operated to slide, comparing the pivot angle γ of a transmission shaft portion about a pivot and the pivot angle δ of a engageable protrusion about the upstream fin shafts.

In this regard, in the first embodiment employing a configuration in which the specific upstream fin 41 is divided into the fin main body 54 and the transmission body 60, the pivots 63 are arranged in a manner displaced from the upstream fin shafts 47. When the operation knob 70 is operated to slide, the transmission shaft portion 62 of the transmission body 60 rotates about the pivots 63. Upon this, the engageable protrusions 57 of the fin main body 54 engaged with the respective elongated holes 64 of the transmission body 60 also rotate about the pivots 63 together with the transmission body 60. Further, the engageable protrusions 57 move within the respective elongated holes 64 of the transmission body 60 to rotate about the upstream fin shafts 47. That is, the engageable protrusions 57 rotate about both the pivots 63 and the upstream fin shafts 47. Furthermore, since the pivots 63 are arranged further upstream than the upstream fin shafts 47 as shown in FIG. 21, the pivot angle γ of the transmission shaft portion 62 (engageable protrusions 57) about the pivots 63 is smaller than the pivot angle δ of the engageable protrusions 57 about the upstream fin shafts 47. Accordingly, with a small movement amount of the fork portions 71, the transmission shaft portion 62 (engageable protrusions 57) rotates about the pivots 63 by the smaller pivot angle γ, while the engageable protrusions 57 rotate about the upstream fin shafts 47 by the greater pivot angle δ. Upon this, the fin main body 54 is tilted at a great angle with the upstream fin shafts 47 as fulcrums, so that the ventilation passage 20 is closed. Since the operation knob 70 is only required to slide a shorter distance, the force for rotating the transmission shaft portion 62 about the upstream fin shafts 47 is less likely to become weak. Thus, the operating load required to operate the operation knob 70 to slide in the specified movable range R2 is less likely to increase. In addition, the difference is small between the operating load required to operate the operation knob 70 to slide in the normal movable range R1 and the operating load required to operate the operation knob 70 to slide in the specified movable range R2.

As shown in FIGS. 6A and 6B, the first embodiment also employs a configuration in which the upstream fin shafts 48 and 49 of the first normal upstream fins 42 and 43 lie on the first inclined line L21 and the upstream fin shaft 51 of the second normal upstream fin 45 lies on the second inclined line L22. This results in that when the ventilation passage 20 is closed, the first normal upstream fins 42 and 43 and the second normal upstream fin 45 act differently from the case where all of the upstream fin shafts 47 to 51 lie on the same straight line.

Figure 22:
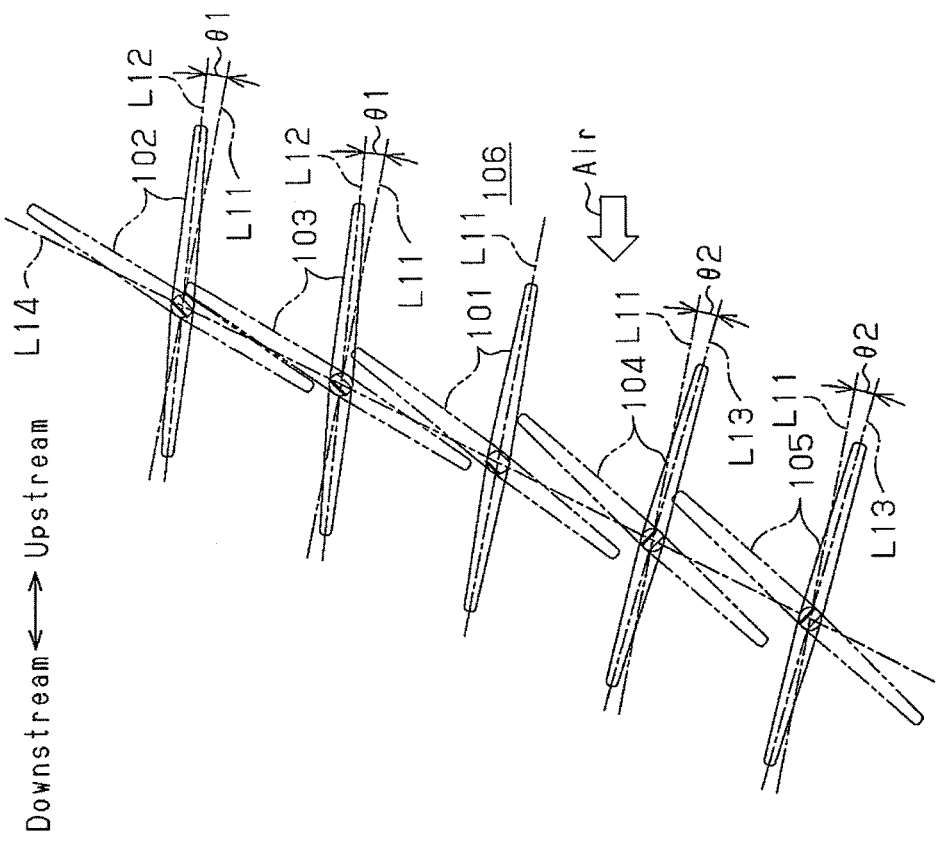
FIG. 22 is a side cross-sectional view according to a comparative example in which respective upstream fin shafts lie on the same straight line, showing a state of respective upstream fins when a ventilation passage is opened together with a state of the respective upstream fins when the ventilation passage is closed.

FIG. 22 shows a comparative example in which all upstream fin shafts lie on a straight line L14. In this air conditioning register, the center fin in the direction of parallel arrangement is a specific fin 101 and the other multiple fins are normal fins 102, 103, 104 and 105. Upon adjusting the direction of flow of air conditioning air, the two normal fins 102 and 103 above the specific fin 101 are inclined with respect to the specific fin 101 such that the distance between the normal fins 102 and 103 and the specific fin 101 decreases toward the downstream side. The angle between a straight line L11 parallel to the specific fin 101 and a straight line L12 extending along the normal fins 102 and 103 is defined as a first inclination angle θ1.

The two normal fins 104 and 105 below the specific fin 101 are inclined with respect to the specific fin 101 such that the distance between the normal fins 104 and 105 and the specific fin 101 decreases toward the downstream side. The angle between the straight line L11 and a straight line L13 extending along the normal fins 104 and 105 is defined as a second inclination angle θ2.

In accordance with this air conditioning register, the air conditioning air flows along the two normal fins 102 and 103 above the specific fin 101 to converge on the air conditioning air flowing along the specific fin 101. The air conditioning air also flows along the two normal fins 104 and 105 below the specific fin 101 to converge on the air conditioning air flowing along the specific fin 101.

However, when the two normal fins 102 and 103 above the specific fin 101 are tilted to come into contact with or close to each other, for example, as indicated by the alternate long and two short dashed line in FIG. 22 to close a ventilation passage 106, gaps are formed between the specific fin 101 and the normal fin 104 as well as between the lower normal fins 104 and 105 through which the air conditioning air can leak. In contrast, in the course of making the two lower normal fins 104 and 105 tilted to come into contact with or close to each other, though not shown, interference occurs between the specific fin 101 and the upper normal fin 103 as well as between the two upper normal fins 102 and 103. This is because the normal fins 102 and 103 above the specific fin 101 and the normal fins 104 and 105 below the specific fin 101 are inclined in mutually opposite directions with respect to the specific fin 101.

In the first embodiment, however, the upstream fin shafts 47 to 51 lie at positions shown in FIGS. 6A and 6B. That is, the upstream fin shafts 47 and 50 lie on the reference line L0, while the upstream fin shafts 48, 49 and 51 lie downstream of the reference line L0. Therefore, when the upstream fins 41 to 45 are tilted to come into contact with or close to each other, the gaps have substantially the same size. As a result, when the ventilation passage 20 is closed, only gaps extremely small in size are formed between adjacent ones of the upstream fins 41 to 45 as shown in FIG. 18. This is because the upstream fin shafts 48, 49 and 51 are displaced downstream of the reference line L0 and thereby the variation of the gaps between the upstream fins 41 to 45 is cancelled.

Accordingly, when the two first normal upstream fins 42 and 43 above the specific upstream fin 41 are tilted to come into contact with or close to each other, only small gaps are formed between the specific upstream fin 41 and the lower adjacent normal upstream fin 44 as well as between the adjacent normal upstream fin 44 and the second normal upstream fin 45. This makes the air conditioning air less likely to leak through the gaps. In contrast to the above, in the course of making the adjacent normal upstream fin 44 and the second normal upstream fin 45 tilted to come into contact with or close to each other, interference can be suppressed between the specific upstream fin 41 and the adjacent first normal upstream fin 43 or between the two upper first normal upstream fins 42 and 43.

The first embodiment described in detail above offers the following advantages.

(1) The transmission shaft portion 62 of the specific upstream fin 41 is sandwiched between the pair of fork portions 71 of the operation knob 70. As the operation knob 70 is operated to slide, the fork portions 71 move the transmission shaft portion 62 and tilt the specific upstream fin 41 to close the ventilation passage (FIG. 11).

With this configuration, the size of the portions (fork portions 71) for transmitting the sliding operation of the operation knob 70 to the specific upstream fin 41 can be reduced to thereby suppress a pressure loss and noise generation from those portions.

(2) The specific upstream fin 41 is divided into the fin main body 54 having the upstream fin shafts 47 and the transmission body 60 having the transmission shaft portion 62 and coupled to the fin main body 54. The transmission body 60 is pivotally supported by the first walls 21 of the case 10 via the pivots 63 that are arranged in a manner displaced upstream from the upstream fin shafts 47 of the fin main body 54 (FIGS. 3 and 4).

With this configuration, the pivot angle γ of the transmission shaft portion 62 about the pivots 63 can be made smaller than the pivot angle δ of the fin main body 54 about the upstream fin shafts 47 (FIG. 21). The operation knob 70 is only required to slide a shorter distance to tilt the specific upstream fin 41 at a greater angle and thereby close the ventilation passage 20.

(3) As described in the advantage (2) above, the operation knob 70 is only required to slide a shorter distance to close the ventilation passage 20. With this configuration, the phenomenon can be avoided in which the force for rotating the transmission shaft portion 62 about the upstream fin shafts 47 becomes weaker and a greater load is therefore required to operate the operation knob 70 to slide in the specified movable range R2. The difference can be made small between the operating load required to operate the operation knob 70 to slide in the normal movable range R1 and the operating load required to operate the operation knob 70 to slide in the specified movable range R2. As a result, the feeling of operation of the operation knob 70 can be improved.

(4) The engageable protrusions 57 are formed on the fin main body 54 to serve as engaging portions, and the holes are formed in the transmission body 60 to serve as receiving portions with which the engageable protrusions 57 are engaged (FIGS. 3 and 4).

With this engagement, the fin main body 54 can be coupled with the transmission body 60 to transmit the tilt of the transmission body 60 via the receiving portions and the engaging portions to the fin main body 54.

In particular, the engaging portions (engageable protrusions 57) rotate about the upstream fin shafts 47 and move with respect to the receiving portions rotating about the pivots 63. Since the receiving portions are constituted by the elongated holes 64, the tilt of the transmission body 60 can be transmitted to the fin main body 54 while allowing the movement of the engaging portions (engageable protrusions 57) relative to the receiving portions.

(5) The transmission body 60 includes the pair of tilt plate portions 61 sandwiching the fin main body 54 therebetween in the axial direction of the upstream fin shafts 47, the transmission shaft portion 62 bridged between the tilt plate portions 61, and the pivots 63 provided on the respective tilt plate portions 61 and supported on the first walls 21 of the case 10 (FIGS. 3 and 4).

With this simple configuration, the transmission body 60 is achieved to transmit the movement of the fork portions 71 to the fin main body 54.

In addition, since the respective pivots 63 are provided on the respective tilt plate portions 61 and supported on the first walls 21 of the case 10, the transmission body 60 can be tilted stably.

(6) The cut-out portions 65 are formed in the respective tilt plate portions 61 (FIGS. 3 and 4).

With this configuration, the upstream fin shafts 47 can enter into the cut-out portions 65, whereby the interference between the tilt plate portions 61 which are configured to be tilted with the pivots 63 as fulcrums, and the upstream fin shafts 47 can be avoided.

Second Embodiment

Next will be described an air conditioning register according to a second embodiment with reference to FIGS. 23 to 30. The description will focus on components of the air conditioning register different from those in the first embodiment.

<Case 10>

Figure 23:
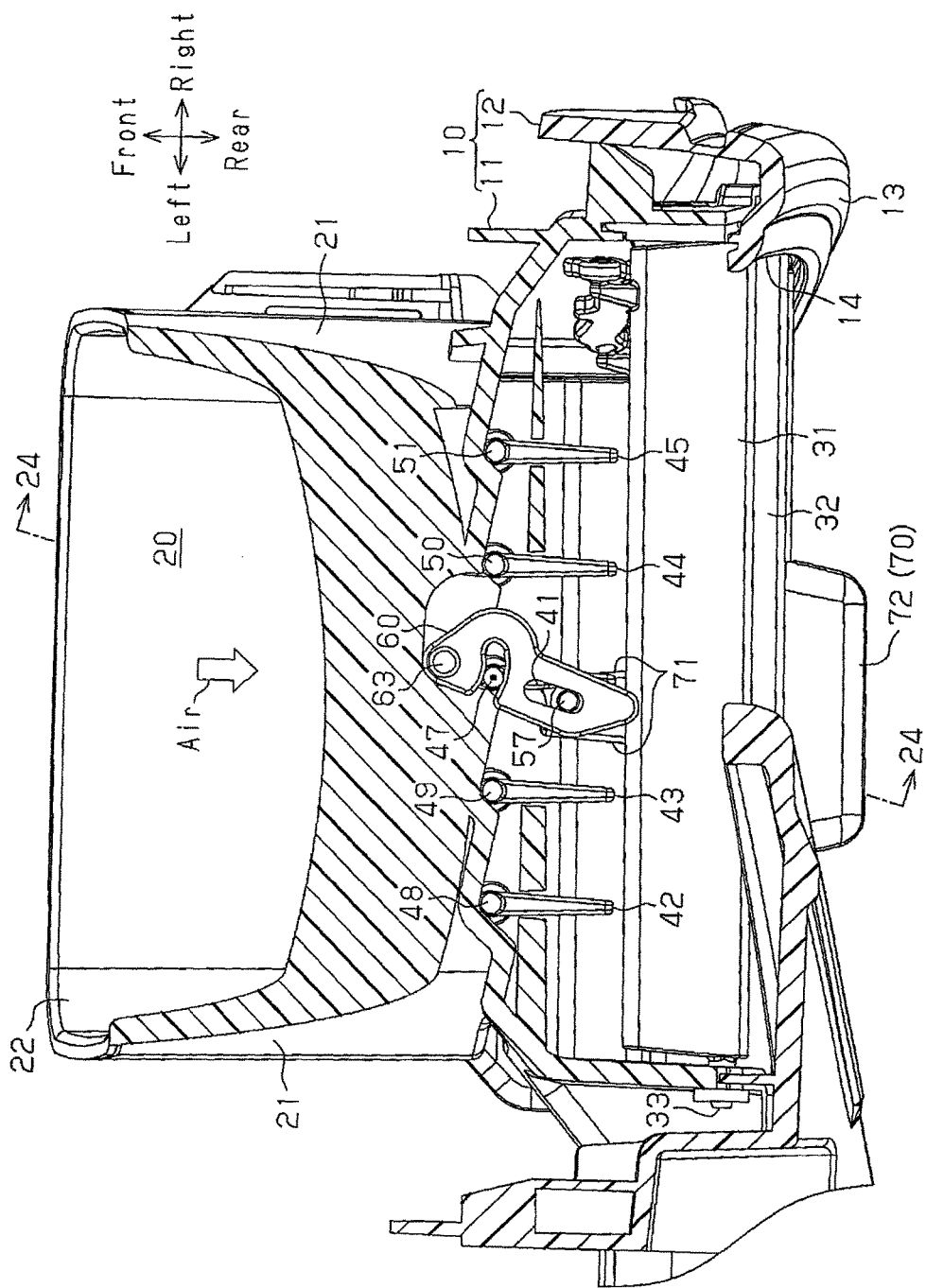
FIG. 23 is a partial planar cross-sectional view showing the internal structure of an air conditioning register according to a second embodiment.
Figure 24:
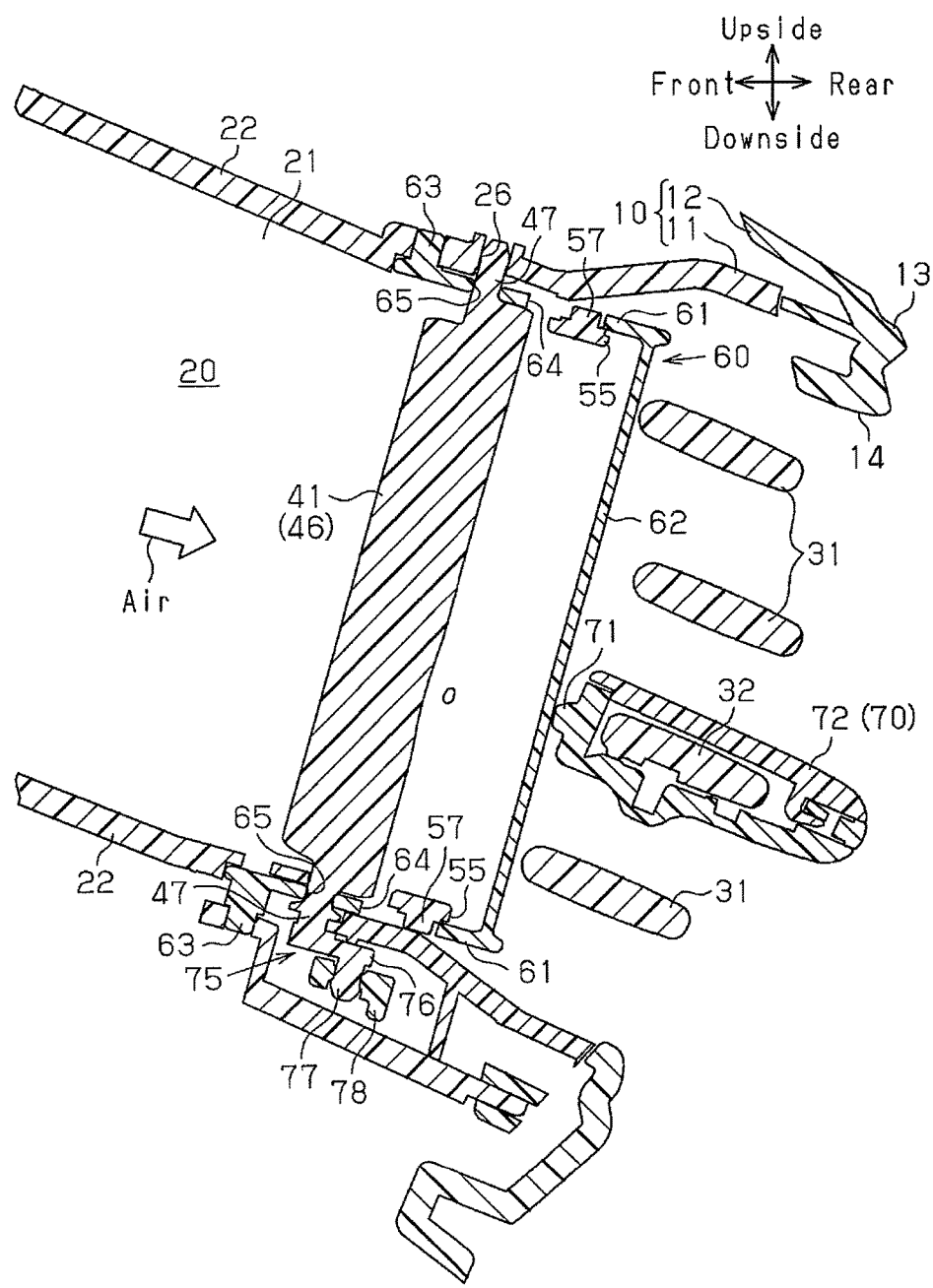
FIG. 24 is a cross-sectional view taken along line 24-24 of FIG. 23.

As shown in FIGS. 23 and 24, the case 10 includes the upstream retainer 11 and the downstream retainer 12. The bezel 13 having the outlet port 14 is formed integrally with the downstream retainer 12. Unlike the first embodiment, the dimensions of the outlet port 14 in the first direction (vertical direction) and in the second direction (lateral direction) are substantially the same.

<Group of Downstream Fins>

The group of downstream fins includes the multiple downstream fins 31 and 32 each formed in an elongated plate shape longer in the second direction than in the direction of airflow. In this second embodiment, the number of the downstream fins 31 and 32 of the group is greater than that in the first embodiment. Among the multiple downstream fins 31 and 32, the operation knob 70 is mounted on the downstream fin 32, but not on the others (the downstream fins 31). The respective downstream fins 31 and 32 have the downstream fin shafts 33 protruding outward from the respective end faces in the second direction. The respective downstream fins 31 and 32 are pivotally supported by the first walls 21 via the downstream fin shafts 33 such that the downstream ends thereof can move in the first direction. The downstream fins 31 and 32 are coupled to each other via an elongated downstream coupling rod (not shown) located in the vicinity of the side portions thereof.

<Group of Upstream Fins>

The group of upstream fins includes one specific upstream fin 41 and multiple (four) normal upstream fins 42 to 45. The upstream fins 41 to 45 are arranged further upstream than the downstream fins 31 and 32 and spaced in the second direction. The specific upstream fin 41 is located in a central portion of the ventilation passage 20 in the second direction. The upstream fins 41 to 45 each have an elongated plate portion 46 longer in the first direction than in the direction of airflow. Upstream fin shafts 47 to 51 protrude outward in the first direction from the respective end faces of the plate portions 46 in the same direction. The respective upstream fin shafts 47 to 51 are located in a substantially central portion of the respective plate portions 46 in the direction of airflow. The upstream fins 41 to 45 are rotationally supported on the upstream fin shafts 47 to 51. The upstream fins 41 to 45 are thus pivotally supported by the second walls 22 such that the downstream ends thereof can move in the second direction.

As shown in FIG. 25, the specific upstream fin 41 is divided into a fin main body 54 and a transmission body 60.

The fin main body 54 includes the pair of projecting sections 55 and the pair of engaging portions in addition to the plate portion 46 and the upstream fin shafts 47. The recess 56 is formed in the downstream end of the plate portion 46 in a manner recessed toward the upstream side. The projecting sections 55 are both provided in the end portions of the plate portion 46 in the first direction. The projecting sections 55 protrude in one thickness direction of the plate portion 46 (to the lower left in FIG. 25) from the plate portion 46 at positions further downstream than the upstream fin shafts 47. The engaging portions are constituted by the engageable protrusions 57 protruding outward in the first direction from the respective projecting sections 55.

The transmission body 60 includes the pair of tilt plate portions 61 located in the vicinity of the inside surfaces of the respective second walls 22 and sandwiching the plate portion 46 therebetween in the axial direction of the upstream fin shafts 47. The transmission shaft portion 62 extending parallel with the upstream fin shafts 47 is bridged between the tilt plate portions 61. In a state where the fin main body 54 is assembled into the transmission body 60, the transmission shaft portion 62 is arranged further downstream than the fin main body 54 (see FIG. 24).

The pivots 63 are provided in the upstream ends of the respective tilt plate portions 61 in a manner protruding outward from the tilt plate portions 61 in the first direction. The pivots 63 of the transmission body 60 are displaced toward the upstream side from the upstream fin shafts 47 of the fin main body 54, and the transmission body 60 is pivotally supported by the second walls 22 of the case 10 via the pivots 63 (see FIG. 24).

In each of the tilt plate portions 61, an elongated hole 64 serving as a receiving portion is formed between the transmission shaft portion 62 and the pivot 63. The elongated holes 64 are opened toward the pivots 63, and the engageable protrusions 57 are engaged movably with the elongated holes 64. Also, in each of the tilt plate portions 61, the cut-out portion 65 of an arc shape is formed between the pivot 63 and the elongated hole 64, and the upstream fin shafts 47 are arranged movably in the cut-out portions 65.

As shown in FIG. 23, the upstream fins 41 to 45 are arranged parallel with each other. The upstream fin shafts 47 to 51 lie on the same line.

<Operation Knob 70>

As shown in FIGS. 23 and 24, the operation knob 70 mainly includes the main body portion 72 fitted on the downstream fin 32 in a manner slidable in the axial direction of the downstream fin shafts 33. The main body portion 72 is formed with the pair of fork portions 71 extending toward the upstream side. The fork portions 71 are separated from each other at a certain interval in the axial direction of the downstream fin shafts 33 and sandwich the transmission shaft portion 62 therebetween.

<Link Mechanism 75>

As shown in FIGS. 24 and 25, the arms 76 extending toward the downstream side are formed on the respective lower upstream fin shafts 47 to 51. The pins 77 protrude downward at positions on the respective arms 76 further downstream than the respective upstream fin shafts 47 to 51. The distances between the upstream fin shafts 47 to 51 and the pins 77 are common to the specific upstream fin 41 and the normal upstream fins 42 to 45. The pins 77 are each located in the vicinity of the inside surface of the lower second wall 22 and coupled via the coupling rod 78 extending in the second direction. The upstream fins 41 to 45, the upstream fin shafts 47 to 51, the arms 76, the pins 77, and the coupling rod 78, and the like constitute the link mechanism 75.

The other configurations are identical to those in the first embodiment. The components identical to those described in the first embodiment are therefore designated by the same reference numerals to omit redundant description thereof.

Next will be described the action of the thus configured air conditioning register according to the second embodiment.

When a force in the thickness direction of the downstream fin 32 is applied to the main body portion 72 of the operation knob 70, the downstream fin 32 is tilted in the same direction with the downstream fin shafts 33 as fulcrums. In conjunction with this, all of the downstream fins 31 are tilted in the same direction. At this time, the fork portions 71 move along the transmission shaft portion 62 in the first direction while sandwiching the transmission shaft portion 62 therebetween. Thus, the movement of the fork portions 71 cannot be transmitted to the transmission shaft portion 62, and therefore the upstream fins 41 to 45 cannot be tilted. The air conditioning air is redirected in the first direction to flow along the tilted downstream fins 31 and 32.

(i) Where the operation knob 70 is operated to slide in the normal movable range R1

Figure 26:
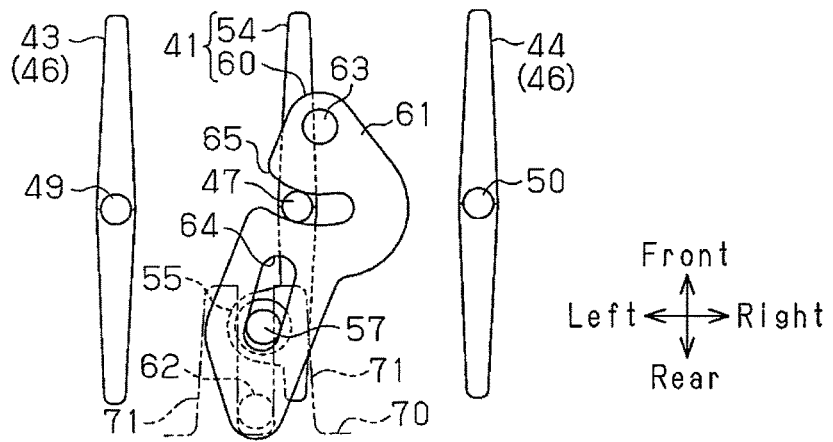
FIG. 26 is a partial plan view of the second embodiment, showing the specific upstream fin and some of the normal upstream fins when an operation knob is operated to slide to a reference position.

FIG. 26 shows the specific upstream fin 41 and a surrounding area thereof when the operation knob 70 is placed at a reference position in a middle portion of the normal movable range R1. At the reference position, all of the upstream fins 41 to 45 are in a neutral position and substantially parallel with the first walls 21. The air conditioning air flows substantially parallel with the upstream fins 41 to 45 and the first walls 21.

Figure 27:
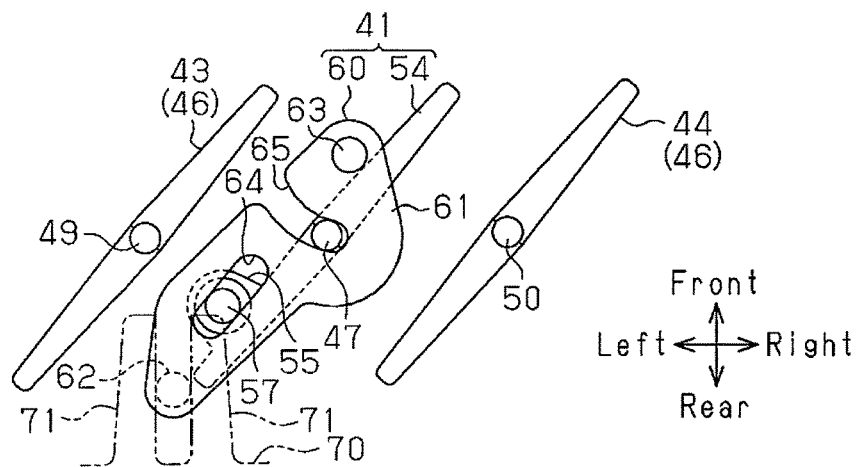
FIG. 27 is a partial plan view showing the specific upstream fin and some of the normal upstream fins when the operation knob is operated to slide leftward from the state shown in FIG. 26.

FIG. 27 shows the specific upstream fin 41 and a surrounding area thereof when the operation knob 70 is operated from the reference position to slide leftward.

With the sliding operation, the fork portions 71 are moved leftward. The trailing (right) fork portion 71 in the moving direction comes into contact with and presses the transmission shaft portion 62 leftward. At this time, the pair of tilt plate portions 61, the transmission shaft portion 62 and the pair of pivots 63 work integrally in the transmission body 60.

That is, when the transmission shaft portion 62 is thus pressed by the fork portion 71, the pressing force that the fork portion 71 applies to the transmission shaft portion 62 is transmitted to the tilt plate portions 61. This transmission results in that the transmission body 60 is tilted clockwise in FIG. 27 with the pivots 63 as fulcrums. As the fork portions 71 thus move, the portion of the transmission shaft portion 62 in contact with the fork portions 71 moves upstream. The tilt of the transmission body 60 is transmitted via the elongated hole 64 and the engageable protrusion 57 to the fin main body 54. This transmission results in that the fin main body 54 is tilted clockwise with the upstream fin shafts 47 as fulcrums.

The leftward linear motion of the operation knob 70 is thus converted into the clockwise tilt motion of the specific upstream fin 41 with the upstream fin shafts 47 as fulcrums. As the fin main body 54 is thus tilted, the upstream fin shafts 47 move deeper into the respective cut-out portions 65.

In addition, the tilt of the specific upstream fin 41 is transmitted via the link mechanism 75 to all of the normal upstream fins 42 to 45. As a result, in conjunction with the specific upstream fin 41, all of the normal upstream fins 42 to 45 are tilted to be inclined clockwise with the upstream fin shafts 48 to 51 as fulcrums. The air conditioning air is thus redirected to flow obliquely leftward along the upstream fins 41 to 45.

When the operation knob 70 is operated from the position shown in FIG. 27 to slide rightward, the respective upstream fins 41 to 45 act in an inverse manner to the action described above.

Figure 28:
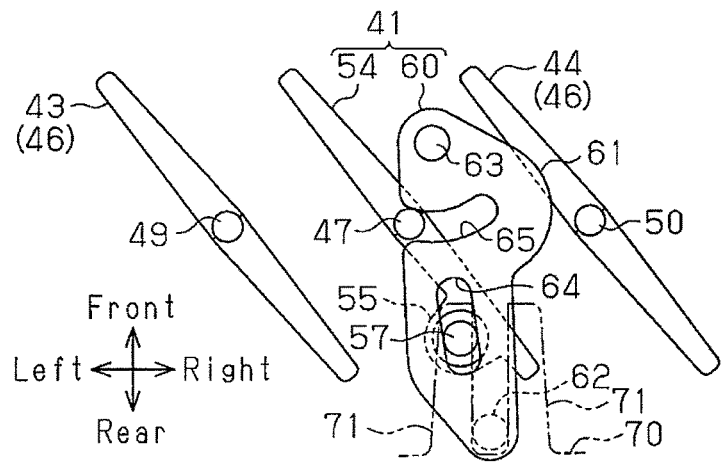
FIG. 28 is a partial plan view showing the specific upstream fin and some of the normal upstream fins when the operation knob is operated to slide rightward from the state shown in FIG. 26.

On the other hand, FIG. 28 shows the specific upstream fin 41 and a surrounding area thereof when the operation knob 70 is operated from the reference position (see FIG. 26) to slide rightward, inversely to the case shown in FIG. 27.

With the sliding operation of the operation knob 70 described above, the fork portions 71 are moved rightward. The trailing (left) fork portion 71 in the moving direction presses the transmission shaft portion 62 rightward. The transmission body 60 is tilted counterclockwise in FIG. 28 with the pivots 63 as fulcrums. With the tilt motion described above, the upstream fin shafts 47 move toward the entrance within the respective cut-out portions 65.

The tilt of the transmission body 60 is transmitted via the elongated hole 64 and the engageable protrusion 57 to the fin main body 54. This transmission results in that the fin main body 54 is tilted counterclockwise with the upstream fin shafts 47 as fulcrums. In addition, the tilt of the specific upstream fin 41 described above is transmitted via the link mechanism 75 to all of the normal upstream fins 42 to 45. In conjunction with the specific upstream fin 41, all of the normal upstream fins 42 to 45 are tilted to be inclined counterclockwise with the upstream fin shafts 48 to 51 as fulcrums. The air conditioning air is thus redirected to flow obliquely rightward along the upstream fins 41 to 45.

When the operation knob 70 is operated from the position shown in FIG. 28 to slide leftward, the respective upstream fins 41 to 45 act in an inverse manner to the action described above.

When the operation knob 70 is operated to adjust the direction of flow of the air conditioning air, the upstream fins 41 to 45 are substantially parallel with each other. Accordingly, unlike the first embodiment described above, the air conditioning air flowing along the normal upstream fins 42 to 45 cannot converge on the air conditioning air flowing along the specific upstream fin 41.

(ii) Where the operation knob 70 is operated to slide in the specified movable range R2

Also in this case, each part operates similar to the case where the operation knob 70 is operated to slide in the normal movable range R1.

Figure 29:
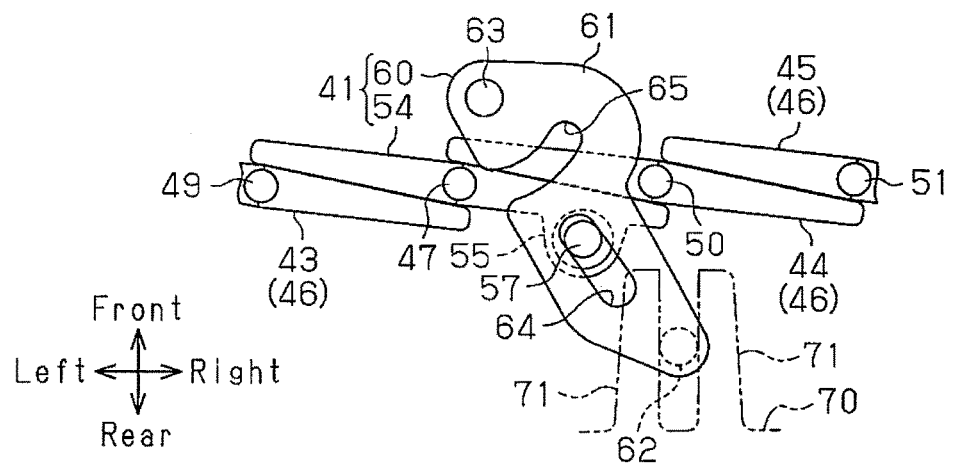
FIG. 29 is a partial plan view showing the specific upstream fin and some of the normal upstream fins when the operation knob is operated to slide further rightward from the state shown in FIG. 28 and a ventilation passage is closed.

When the operation knob 70 is operated to slide to the end portion of the specified movable range R2 farther from the normal movable range R1, the air conditioning register is in the state shown in FIG. 29. In this state, the portion of the transmission shaft portion 62 in contact with the fork portions 71 moves upstream. The engageable protrusion 57 moves upstream within the elongated hole 64, and the upstream fin shafts 47 escape the respective cut-out portions 65. The upstream fins 41 to 45 are tilted to be substantially perpendicular to the direction of airflow.

Downstream portions of the upstream fins 41 to 44, which are trailing portions in the tilt direction, are overlaid on upstream portions of the upstream fins 41 and 43 to 45, which are leading portions in the tilt direction. The ventilation passage 20 is substantially closed by all of the upstream fins 41 to 45, whereby the blowing of the air conditioning air through the outlet port 14 is significantly limited.

When the operation knob 70 is operated from the position shown in FIG. 29 to slide leftward along the downstream fin 32, the respective upstream fins 41 to 45 act in an inverse manner to the action described above.

The second embodiment also employs a configuration in which the pair of fork portions 71 sandwich the transmission shaft portion 62 therebetween, as is the case in the first embodiment. In this configuration, the fork portions 71 are required to have a sufficient length in the direction of airflow so that the transmission shaft portion 62 rotating about the pivots 63 cannot escape the fork portions 71. It is, however, not necessary to increase the dimensions of the fork portions 71 in the axial direction of the downstream fin shafts 33 and in the thickness direction of the downstream fin 32 to ensure the engagement between the fork portions 71 and the transmission shaft portion 62. This allows the resistance (ventilation resistance) of the fork portions 71 when the air conditioning air flows through the ventilation passage 20 to be reduced, which accordingly can suppress a pressure loss and noise generation from the portions (fork portions 71) for transmitting the sliding operation of the operation knob 70 to the specific upstream fin 41.

Figure 30:
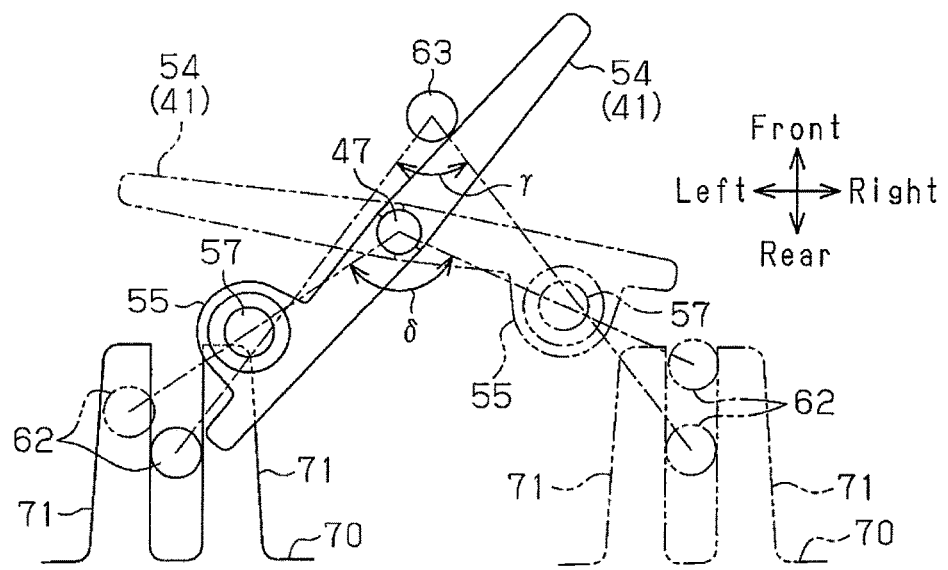
FIG. 30 is a partial plan view of the second embodiment, illustrating an action of the operation knob operated to slide, comparing the pivot angle γ of a transmission shaft portion about a pivot and the pivot angle δ of the engageable protrusion about the upstream fin shafts.

FIG. 30 illustrates an action of the operation knob 70 operated to slide, as is the case in FIG. 21, comparing the pivot angle γ of the transmission shaft portion 62 (engageable protrusions 57) about the pivots 63 and the pivot angle δ of the engageable protrusions 57 about the upstream fin shafts 47. In the second embodiment, the specific upstream fin 41 is divided into the fin main body 54 and the transmission body 60, and the pivots 63 are arranged in a manner displaced toward the upstream side from the upstream fin shafts 47. In the second embodiment, when the operation knob 70 is operated to slide as shown in FIG. 30, the transmission shaft portion 62 of the transmission body 60 rotates about the pivots 63. Upon this, the engageable protrusions 57 of the fin main body 54 engaged with the respective elongated holes 64 of the transmission body 60 also rotate about the pivots 63 together with the transmission body 60. Further, the engageable protrusions 57 move within the respective elongated holes 64 of the transmission body 60 to rotate about the upstream fin shafts 47. That is, the engageable protrusions 57 rotate about both the pivots 63 and the upstream fin shafts 47. Furthermore, the pivot angle γ of the transmission shaft portion 62 (engageable protrusions 57) about the pivots 63 is smaller than the pivot angle δ of the engageable protrusions 57 about the upstream fin shafts 47. Accordingly, with a small movement amount of the fork portions 71, the transmission shaft portion 62 (engageable protrusions 57) rotates about the pivots 63 by the smaller pivot angle γ, while the engageable protrusions 57 rotate about the upstream fin shafts 47 by the greater pivot angle δ, whereby the ventilation passage 20 is closed.

Moreover, since the ventilation passage 20 can be closed with a sliding amount of the operation knob 70, the force for rotating the transmission shaft portion 62 about the upstream fin shafts 47 is less likely to become weak and thereby the operating load required to operate the operation knob 70 to slide in the specified movable range R2 is made less likely to increase. In addition, the difference is small between the operating load required to operate the operation knob 70 to slide in the normal movable range R1 and the operating load required to operate the operation knob 70 to slide in the specified movable range R2.

Accordingly, the second embodiment offers the same advantages (1) to (6) as described above.

The above-described embodiments may be implemented as the following modifications.

<Modification to Group of Downstream Fins>

The number of downstream fins in the group may be modified to be different from those in the first and second embodiments. In this case, the minimum number of downstream fins is "1."

<Modification to Normal Upstream Fins 42 to 45>

The number of normal upstream fins 42 to 45 may be modified to be different from those in the above-described embodiments as long as the number is plural.

<Modification to the Engaging and Receiving Portions>

Instead of the elongated holes 64 penetrating the respective tilt plate portions 61, recesses recessed in the inside surface of the tilt plate portions 61 may be provided as receiving portions provided in the transmission body 60, and the engageable protrusions 57 of the fin main body 54 may be engaged with the respective recesses.

Inversely to the first and second embodiments, holes or recesses serving as receiving portions may be provided in the fin main body 54, while engageable protrusions serving as engaging portions may be provided on the transmission body 60. Also in this case, the engaging portions are engaged with the receiving portions and thereby the fin main body 54 is coupled to the transmission body 60.

<Modifications to Location to be Applied>

The air conditioning register is applicable as an air conditioning register provided to a location other than on the instrument panel in the vehicle, such as a dashboard.

The air conditioning register is widely applicable without limiting to vehicle air conditioning as long as the direction of air conditioning air fed from an air conditioner to be blown into a compartment can be adjusted with a fin and the supply can also be blocked by the fin.

<Other Modification>

The air conditioning register is also applicable as a low-profile air conditioning register in which the outlet port 14 is horizontally long unlike the first embodiment.

Therefore, the present examples and embodiments are to be considered as illustrative and not restrictive and the invention is not to be limited to the details given herein, but may be modified within the scope and equivalence of the appended claims.

The invention claimed is:

1. An air conditioning register comprising:
   a case having a ventilation passage for air conditioning air;
   a downstream fin pivotally supported by the case via a downstream fin shaft;
   a group of upstream fins including a specific upstream fin and at least one normal upstream fin, wherein each upstream fin is pivotally supported by the case via an upstream fin shaft, the specific upstream fin and the normal upstream fin are located upstream of the downstream fin, extend in a direction perpendicular to the downstream fin, and are coupled to each other, and wherein the specific upstream fin has a transmission shaft portion extending parallel with the upstream fin shafts; and
   an operation knob mounted on the downstream fin in a manner slidable in the axial direction of the downstream fin shaft and having a fork portion sandwiching therebetween the transmission shaft portion of the specific upstream fin, the fork portion being configured to move the transmission shaft portion according to sliding of the operation knob, wherein
   the normal upstream fin and the specific upstream fin are pivotal to selectively open and close the ventilation passage, the specific upstream fin is dividable into a fin main body having the upstream fin shaft and a transmission body having the transmission shaft portion and coupled to the fin main body, the transmission body includes a pair of pivots arranged to be displaced toward the upstream side from the upstream fin shaft of the fin main body, the transmission body is pivotally supported by the case via the pivots, the transmission body includes a pair of tilt plate portions sandwiching the fin main body therebetween in the axial direction of the upstream fin shafts, the transmission shaft portion is bridged between the pair of tilt plate portions, the pair of pivots extend from the respective tilt plate portions, and the tilt plate portions are each formed with a cut-out portion.

2. The air conditioning register according to claim 1, wherein
one of the fin main body and the transmission body has an engaging portion and the other has an receiving portion, and
the engaging portion is arranged to be engaged with the receiving portion so that the fin main body is coupled to the transmission body.

3. The air conditioning register according to claim 2, wherein
the engaging portion includes an engageable protrusion, and
the receiving portion includes a hole or a recess.

4. The air conditioning register according to claim 3, wherein
the receiving portion includes an elongated hole, and
the engaging portion includes an engageable protrusion to be engaged with the elongated hole to be movable relative to the elongated hole.

5. An air conditioning register comprising:
a case having a ventilation passage for air conditioning air,
a downstream fin pivotally supported by the case via a downstream fin shaft,
a group of upstream fins including a specific upstream fin and at least one normal upstream fin, the specific upstream fin and the normal upstream fin being coupled to each other, each upstream fin being pivotally supported by the case by an upstream fin shaft, and the specific upstream fin having a transmission shaft portion extending parallel with the upstream fin shafts, both of the specific upstream fin and the normal upstream fin being located upstream of the downstream fin and extending in a direction perpendicular to the downstream fin, and the specific upstream fin having a transmission shaft portion extending parallel with the upstream fin shafts, and an operation knob being slidably mounted on the downstream fin and slidably moving in the axial direction of the downstream fin shaft, the operation knob having a fork portion sandwiching therebetween the transmission shaft portion of the specific upstream fin, the fork portion being connected to the transmission shaft portion and moving the transmission shaft relative to sliding of the operation knob, wherein the normal upstream fin and the specific upstream fin pivot about the upstream fin shafts to selectively open and close the ventilation passage, the specific upstream fin includes a fin main body coupled to a transmission body, the fin main body having the upstream fin shaft, and the transmission body having the transmission shaft portion, the transmission body includes a pair of tilt plate portions sandwiching the fin main body therebetween in the axial direction of the upstream fin shafts, the transmission shall portion of the transmission body bridging the pair of tilt plate portions, the transmission body includes a pair of pivots arranged upstream from the upstream fin shaft of the fin main body, the pair of pivots respectively extending from opposing ends of the tilt plate portions of the transmission body into corresponding holes of the case and pivotally supporting the transmission body, and the tilt plate portions are each formed with a cut-out portion and the upstream fin shafts are located movably in the cut-out portions.

6. The air conditioning register according to claim 5, wherein one of the fin main body and the transmission body has an engaging portion and the other has a receiving portion, and the engaging portion engages with the receiving portion and couples the fin main body to the transmission body.

7. The air conditioning register according to claim 6, wherein the engaging portion includes an engageable protrusion, and the receiving portion includes a hole or a recess.

8. The air conditioning register according to claim 7, wherein the receiving portion includes an elongated hole, and the engaging portion includes an engageable protrusion that engages the elongated hole and moves relative to the elongated hole.

* * * * *